United States Patent
Imaeda

(10) Patent No.: US 10,037,161 B2
(45) Date of Patent: Jul. 31, 2018

(54) TIERED STORAGE SYSTEM, STORAGE CONTROLLER, AND METHOD FOR DEDUPLICATION AND STORAGE TIERING

(71) Applicants: Kabushiki Kaisha Toshiba, Minato-ku (JP); Toshiba Solutions Corporation, Kawasaki-shi (JP)

(72) Inventor: Takaaki Imaeda, Musashino (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 367 days.

(21) Appl. No.: 15/046,002

(22) Filed: Feb. 17, 2016

(65) Prior Publication Data

US 2017/0115922 A1    Apr. 27, 2017

(30) Foreign Application Priority Data

Oct. 21, 2015    (JP) .................................. 2015-207130

(51) Int. Cl.
G06F 3/06 (2006.01)

(52) U.S. Cl.
CPC ............ *G06F 3/0631* (2013.01); *G06F 3/061* (2013.01); *G06F 3/0604* (2013.01); *G06F 3/0608* (2013.01); *G06F 3/0641* (2013.01); *G06F 3/0649* (2013.01); *G06F 3/0685* (2013.01)

(58) Field of Classification Search
CPC .... G06F 3/0631; G06F 3/0604; G06F 3/0608; G06F 3/061; G06F 3/0641; G06F 3/0649; G06F 3/0685
See application file for complete search history.

(56) References Cited

FOREIGN PATENT DOCUMENTS

| JP | 2010-218194 | 9/2010 |
|---|---|---|
| JP | 2013-47933 | 3/2013 |
| JP | 2014-525073 | 9/2014 |
| WO | WO 2012/17731 A1 | 12/2012 |

*Primary Examiner* — Ramon A. Mercado
(74) *Attorney, Agent, or Firm* — Oblon, McClelland, Maier & Neustadt, L.L.P.

(57) ABSTRACT

According to one embodiment, a deduplication controller in a tiered storage system excludes data duplication physical chunk by physical chunk. Based on the input/output statistics of logical chunks, a tiering controller in the system acquires the input/output statistics of physical chunks, each of which is allocated to one or more of the logical chunks. Based on the input/output statistics of the physical chunks, the tiering controller further executes at least an operation of relocating the data of a physical chunk in a first storage device to a physical chunk in a second storage device that is lower in access speed, or an operation of relocating the data of a physical chunk in the second storage device to a physical chunk in the first storage device.

20 Claims, 18 Drawing Sheets

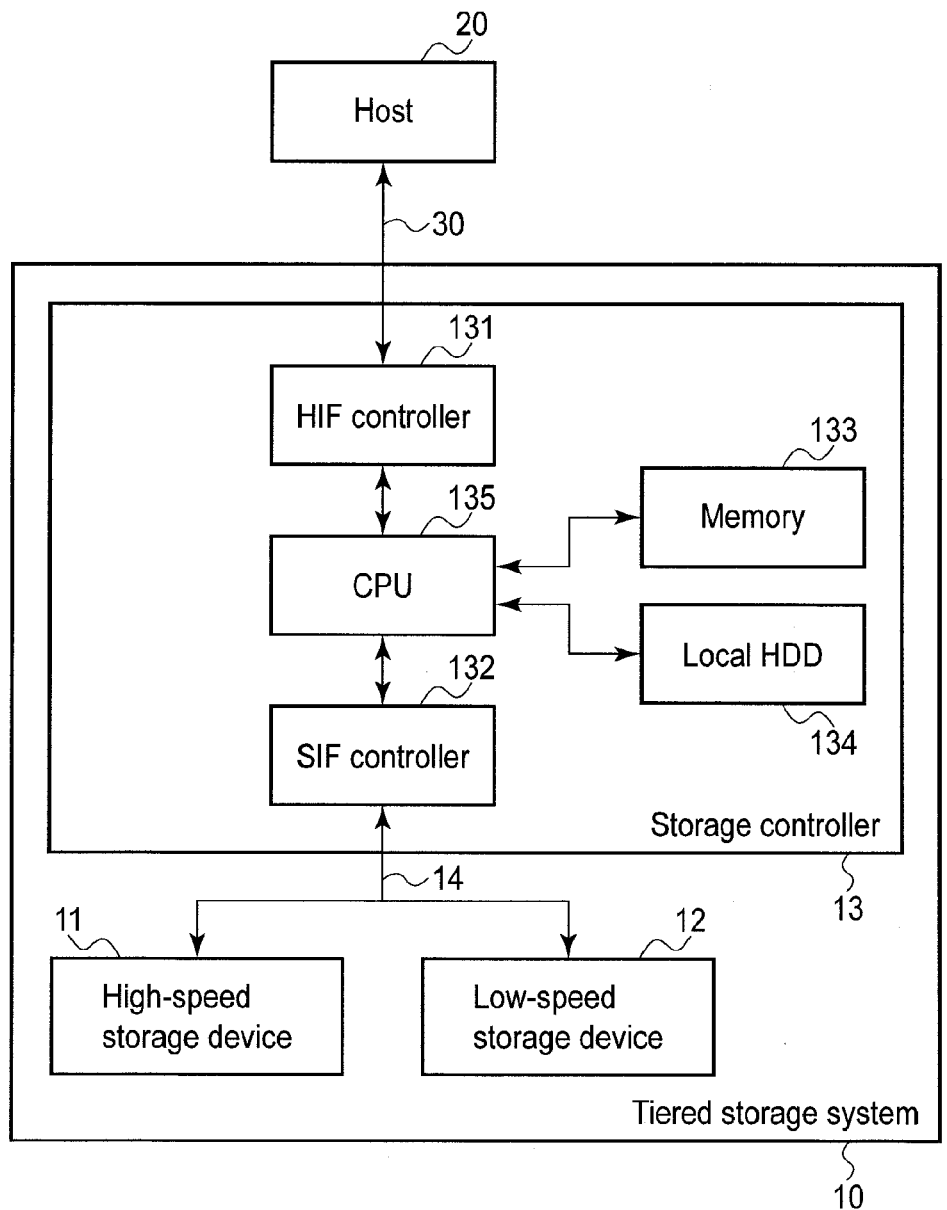
F I G. 1

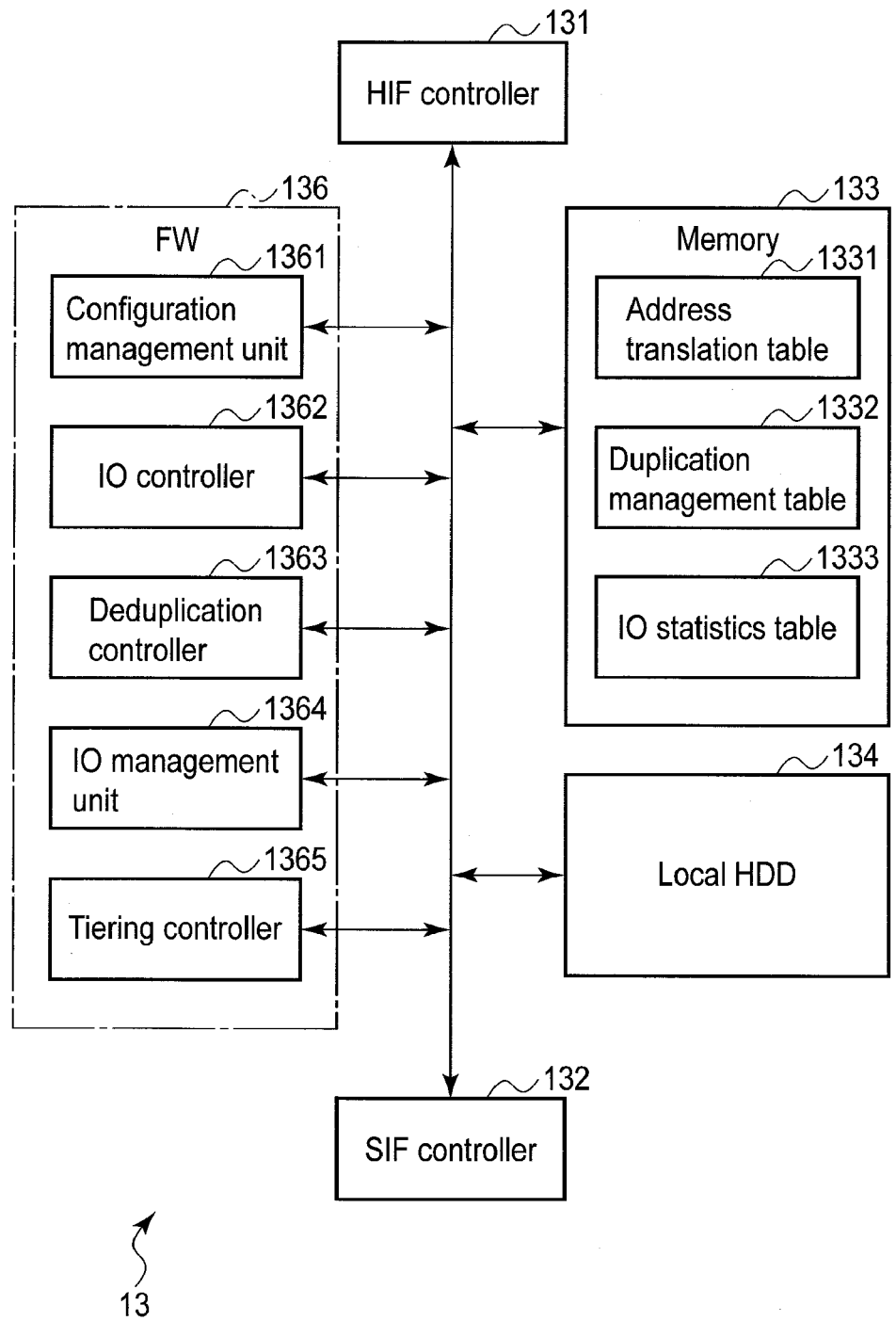
F I G. 2

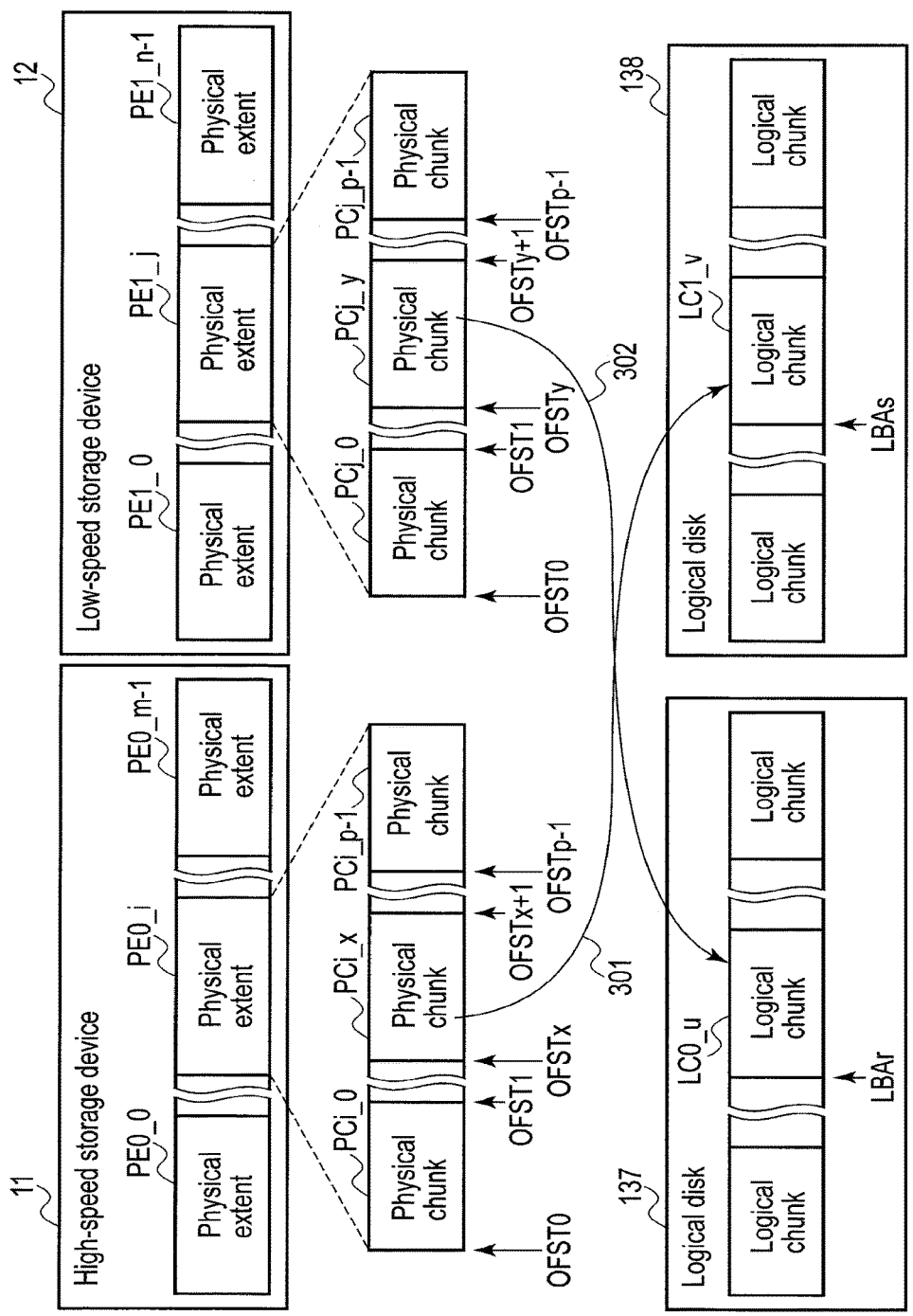
F I G. 3

1331

Address translation table

1331a

| Logical disk ID | LBA | Physical chunk ID |
|---|---|---|
| LDID0 | LBA0 | PCID0 |
| LDID0 | LBA1 | — |

1331b

| Physical chunk ID | Storage ID | Extent ID | Offset |
|---|---|---|---|
| PCID0 | SID0 | PEID0 | OFST0 |
| PCID1 | SID0 | PEID0 | OFST1 |

F I G. 4

1332

Duplication management table

| Physical chunk ID | Hash value | Duplication count |
|---|---|---|
| PCID0 | Ha | DCNTc |
| PCID1 | — | 0 |

F I G. 5

1333
| IO statistics table |||
| Logical disk ID | LBA | IO count |
| --- | --- | --- |
| LDID0 | LBA0 | IOCNTd |
| LDID0 | LBA1 | 0 |
F I G. 6
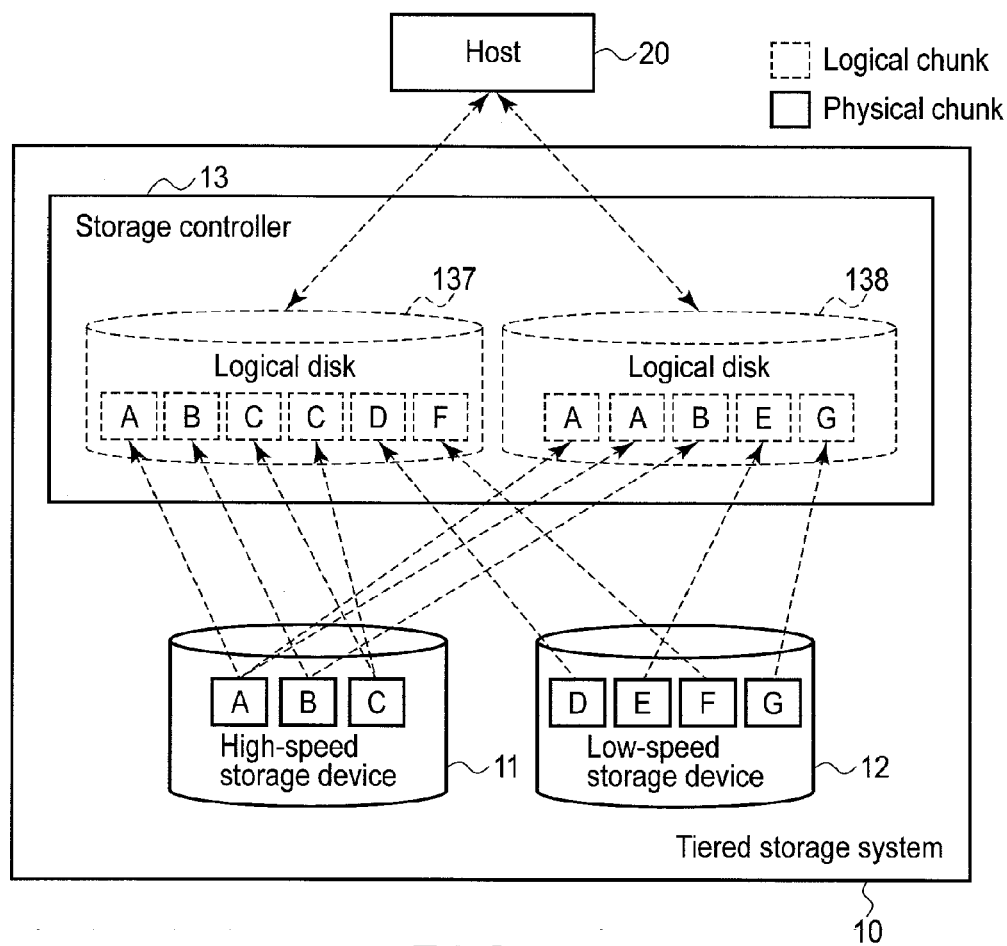
F I G. 7

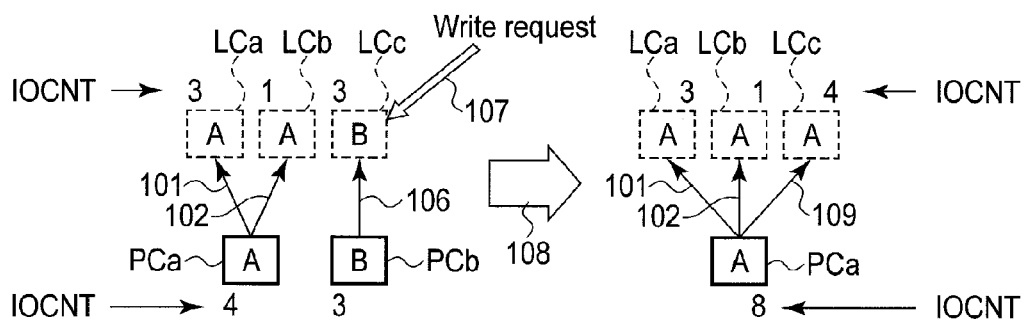
F I G. 11
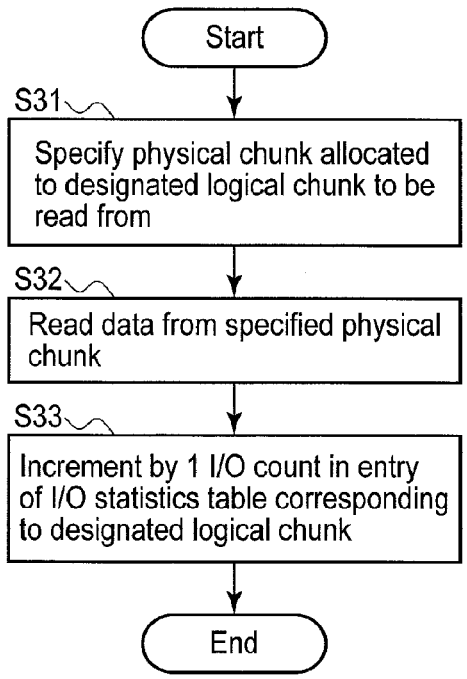
F I G. 12

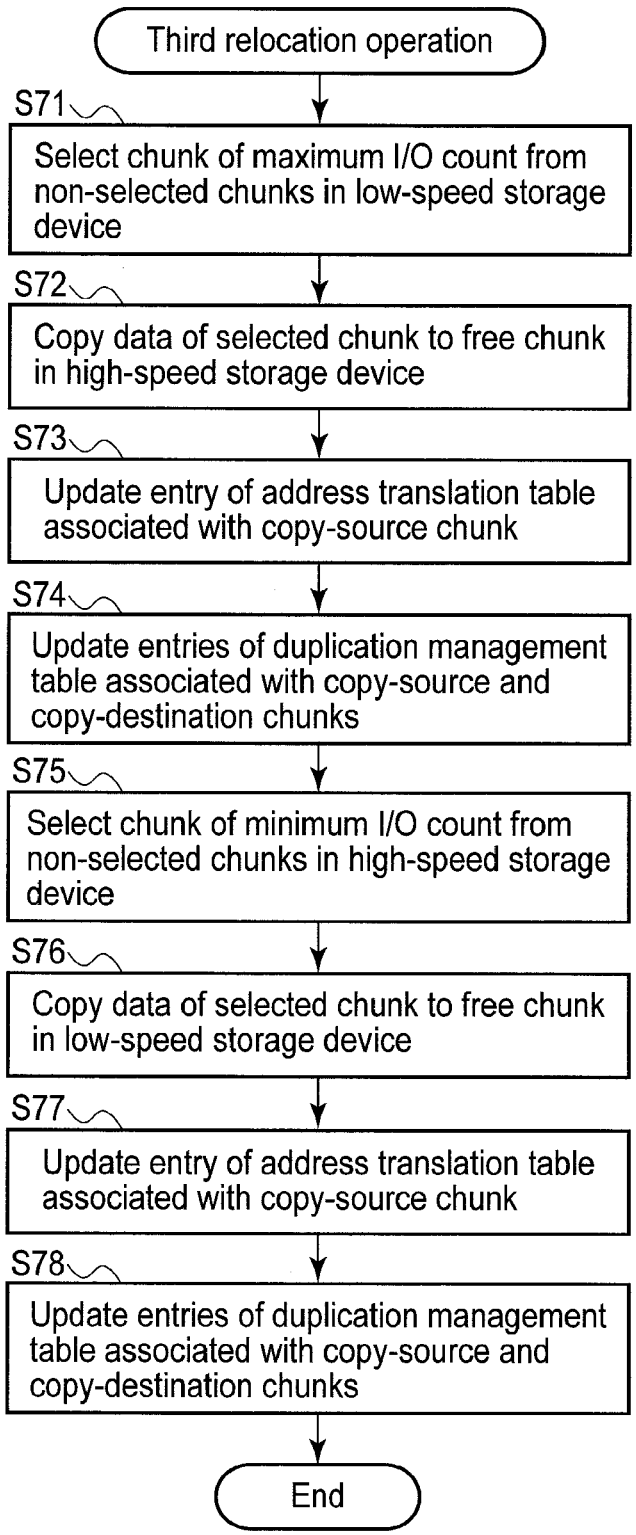
F I G. 16

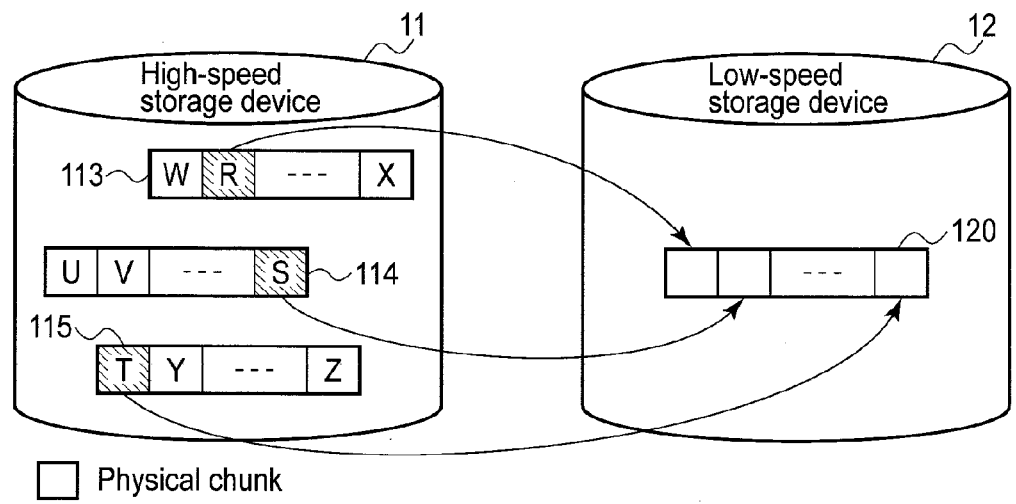
F I G. 23
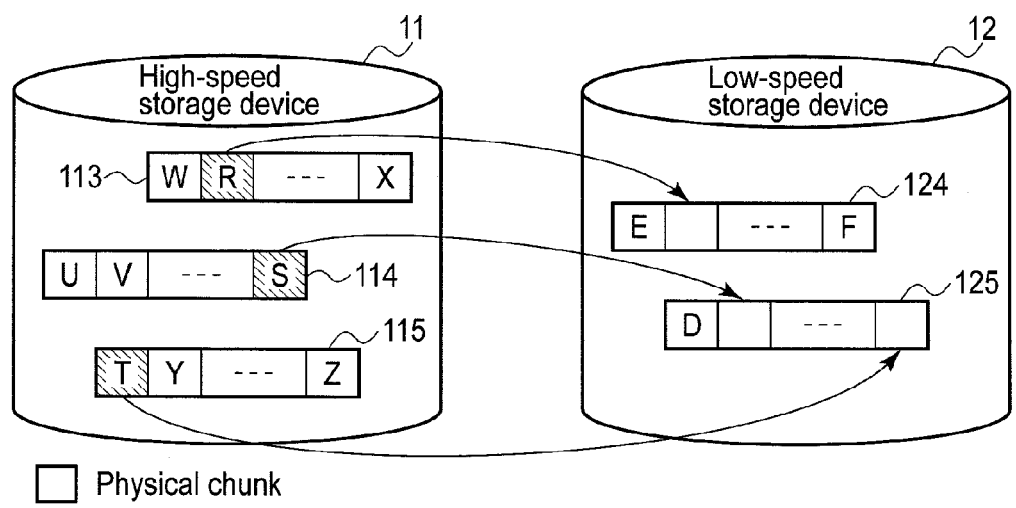
F I G. 24

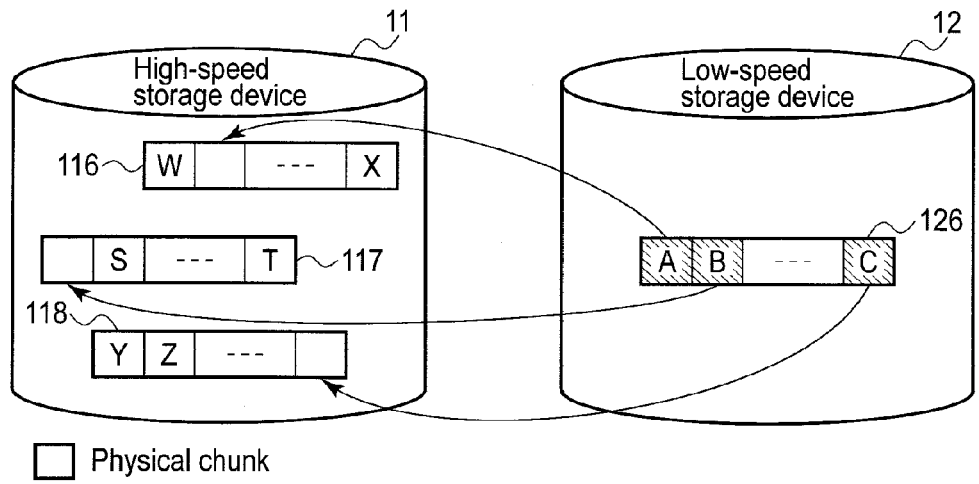
F I G. 25
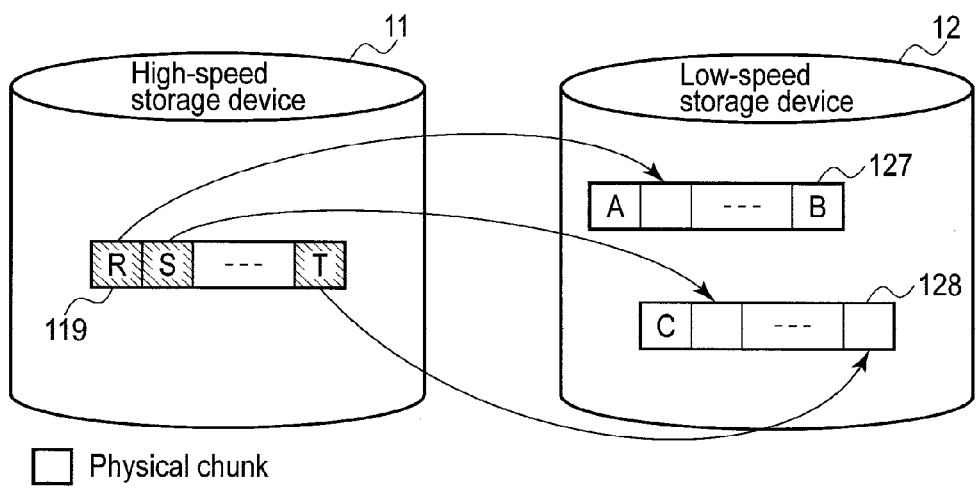
F I G. 26

TIERED STORAGE SYSTEM, STORAGE CONTROLLER, AND METHOD FOR DEDUPLICATION AND STORAGE TIERING

CROSS-REFERENCE TO RELATED APPLICATIONS

This application is based upon and claims the benefit of priority from Japanese Patent Application No. 2015-207130, filed Oct. 21, 2015, the entire contents of which are incorporated herein by reference.

FIELD

Embodiments described herein relate generally to a tiered storage system, a storage controller, and a method for deduplication and storage tiering.

BACKGROUND

A storage system including a plurality of storage devices of different access speeds has recently been developed. In this storage system, a storage controller provides, based on the storage areas of the storage devices, a logical disk including a virtualized storage area to a host computer (host) that uses the storage system. The logical disk is also called a logical volume or logical unit.

The storage areas (physical storage areas) of the storage devices are divided into particular unit areas for management. These particular unit areas are generally called physical extents. The storage controller allocates, to the logical disk, a certain number of arbitrary physical extents in the storage devices, which corresponds to the size of the logical disk. The storage controller thus constructs the logical disk. An area in the logical disk, to which a physical extent is allocated, is called a logical extent.

Assume here that the above-mentioned storage system includes first and second storage devices. Assume also that the first storage device is a high-speed storage device of faster access, such as a solid-state drive (SSD). In contrast, the second storage device is assumed to be a low-speed storage device, such as a hard disk drive (HDD), which has a lower access speed than the first storage device.

The storage controller discriminates the first and second storage devices based on the difference in access speed, and combines the physical extents in the first and sector storage devices in a tiered manner. This operation is called storage tiering, and the storage system, to which the storage tiering is applied, is called a tiered storage system. In the description below, the first and second storage devices will be referred to as a high-speed storage device and a low-speed storage device, respectively.

In the tiered storage system, the storage controller supervises the situation of access to each logical extent. The storage controller generally uses an access (input/output) statistic as an index indicating the access situation. The access statistic is expressed by, for example, the number of accesses to each logical extent (namely, the number of inputs/outputs for read/write).

Based on the access statistics of logical extents, the storage controller dynamically changes allocation of physical extents to the logical extents. That is, if a physical extent in the low-speed storage device is allocated to a logical extent of a high access frequency, the storage controller re-allocates a physical extent in the high-speed storage device to the logical extent of the high access frequency. Similarly, if a physical extent in the high-speed storage device is allocated to a logical extent of a low access frequency, the storage controller re-allocates a physical extent in the low-speed storage device to the logical extent of the low access frequency.

Thus, based on the access statistics of respective logical extents, the storage controller dynamically relocates the data of physical extents of an upper tier to physical extents of a lower tier, and the data of physical extents of the lower tier to physical extents of the higher tier. By this relocation (reallocation), the storage controller can achieve optimization of performance of the logical disk, using limited storage resources.

There are some conventional techniques of effectively utilizing the limited storage capacity of the storage system. As one of them, a deduplication technique is now attracting attention. In this deduplication technique, data items of the same content are prevented from being stored in the storage system in a duplication manner. Duplication of data is generally determined small area (called a chunk) by small area, for example. In general, the size of the chunk is smaller than that of an extent (extent size).

In recent years, application of the deduplication has also come to be requested in the above-described tiered storage system. In the conventional storage systems that employ the deduplication technique, deduplication is generally executed chunk by chunk that is smaller than an extent. Therefore, in order to execute deduplication in a tiered storage system, it is preferable to acquire the access statistic of each logical chunk in the logical disk, instead of the access statistic of each logical extent.

When the deduplication technique is employed, it is strongly possible that the data of a particular chunk (physical chunk) in the high-speed or low-speed storage device is used as the data of a plurality of chunks (logical chunks) in the logical disk. In this case, even if the access statistic of each logical chunk in the logical disk is acquired, it does not necessarily indicate the access statistic of a corresponding physical chunk. Therefore, even if the data of the physical chunks is relocated based on the access statistics of the logical chunks, the relocation does not necessarily reflect the situation of access to the physical chunks. Accordingly, it is difficult to optimize the performance of the logical disk.

BRIEF DESCRIPTION OF THE DRAWINGS

FIG. 1 is a block diagram showing an exemplary hardware configuration of a computer system that includes a tiered storage system according to an embodiment;

FIG. 2 is a block diagram mainly showing an exemplary functional configuration of a storage controller shown in FIG. 1;

FIG. 3 is a block diagram showing an exemplary relationship, employed in the embodiment, between physical extents and physical chunks, and between the physical chunks and logical chunks;

FIG. 4 is a view showing a data structure example of an address translation table shown in FIG. 2;

FIG. 5 is a view showing a data structure example of a duplication management table shown in FIG. 2;

FIG. 6 is a view showing a data structure example of an input/output (I/O) statistics table shown in FIG. 2;

FIG. 7 is a view showing an example of deduplication in the embodiment;

FIG. 11 is a view for explaining exemplary takeover of an I/O count performed when a data write to a physical chunk is prevented for deduplication;

FIG. 12 is a flowchart showing an exemplary procedure of read processing in the embodiment;

FIG. 16 is a flowchart showing an exemplary procedure of a third relocation operation included in the relocation processing shown in FIG. 13;

FIG. 23 is a view showing a third example of relocation in the first modification;

FIG. 24 is a view showing a fourth example of relocation in the first modification;

FIG. 25 is a view showing an example of relocation in a second modification of the embodiment; and FIG. 26 is a view showing an example of relocation in a third modification of the embodiment.

DETAILED DESCRIPTION

Figure 8:
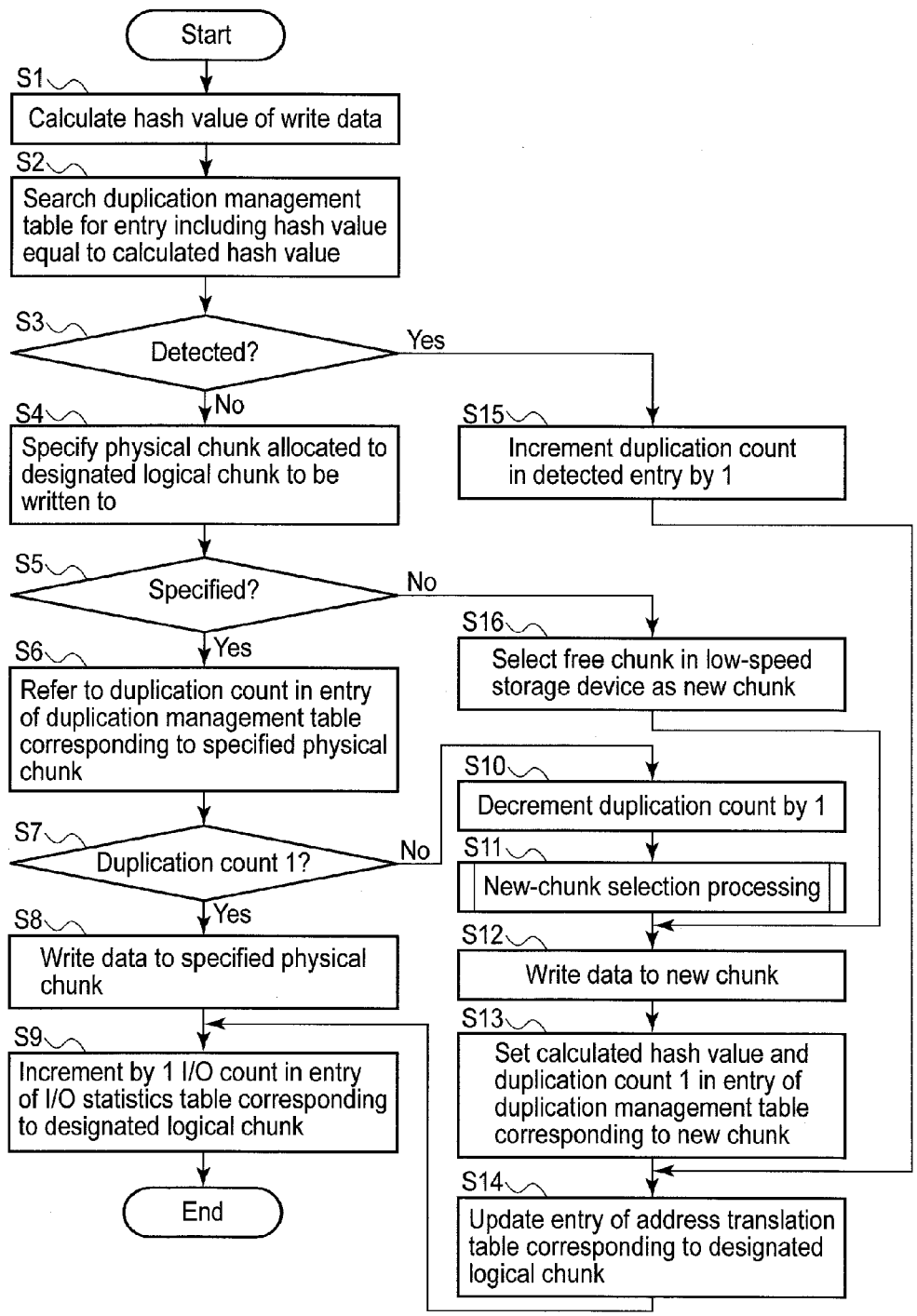
FIG. 8 is a flowchart showing an exemplary procedure of write processing in the embodiment.

Various embodiments will be described hereinafter with reference to the accompanying drawings.

In general, according to one embodiment, a tiered storage system comprises a first storage device, a second storage device and a storage controller. The first storage device includes a storage area comprising a plurality of physical chunks. The second storage device includes a storage area comprising a plurality of physical chunks and has a lower access speed than the first storage device. The storage controller controls access to the first and second storage devices. The storage controller comprises a configuration management unit, an input/output controller, a deduplication controller, an input/output management unit and a tiering controller. The configuration management unit constructs a logical disk including a virtual storage area which comprises a plurality of logical chunks, based on the storage area of each of the first and second storage devices, and provides the logical disk to a host computer utilizing the tiered storage system. The input/output controller reads data from the first or second storage device or writes data to the first or second storage device, in accordance with an access request from the host computer. When first data is virtually written to a first logical chunk in accordance with the access request, the deduplication controller determines whether second data of same content as the first data is stored in at least one of the first and second storage devices. In a first case where the second data is stored in a first physical chunk which is allocated at least to a second logical chunk and is in one of the first and second storage devices, the deduplication controller also allocates the first physical chunk to the first logical chunk and prevents actual writing of the first data for deduplication. In a second case where the second data is stored in neither of the first and second storage devices, the deduplication controller allocates, to the first logical chunk, a second physical chunk which is free and is in one of the first and second storage devices, and causes the input/output controller to write the first data to the second physical chunk. The input/output management unit acquires input/output statistics indicating states of access to the plurality of logical chunks. The tiering controller acquires, based on the input/output statistics of the plurality of logical chunks, input/output statistics of physical chunks, each of which is allocated to one or more of the plurality of logical chunks, and executes at least one of a first relocation operation and a second relocation based on the input/output statistics of the physical chunks. The first relocation operation includes relocating, to a fourth physical chunk in the first storage device, data in a third physical chunk in the second storage device. The third physical chunk is allocated to a third logical chunk. The second relocation operation includes relocating, to a sixth physical chunk in the second storage device, data in a fifth physical chunk in the first storage device. The fifth physical chunk is allocated to a fourth logical chunk.

FIG. 1 is a block diagram showing an exemplary hardware configuration of a computer system that includes a tiered storage system according to an embodiment. The computer system shown in FIG. 1 includes a tiered storage system 10 and a host computer (hereinafter, referred to as the host) 20. That is, the computer system includes a single host. However, the computer system may include a plurality of hosts.

The host 20 uses a logical disk provided by the tiered storage system 10 as its own external storage device. The host 20 is connected to the tiered storage system 10 (more specifically, to a storage controller 13 in the tiered storage system 10) through, for example, a host interface bus 30. In the embodiment, the host interface bus 30 is a fibre channel (FC). However, the host interface bus 30 may be an interface bus other than the FC, such as a small computer system interface (SCSI), a serial attached SCSI (SAS), Internet SCSI (iSCSI), Ethernet (registered trademark), or a serial AT attachment (SATA). The host 20 may also be connected to the tiered storage system 10 via a network, such as a storage area network (SAN), the Internet, or an intranet.

The host 20 is a physical computer such as a server or a client personal computer (client PC). In the host 20, an application program for accessing data in a logical disk provided by the tiered storage system 10 operates. In accordance with this application program, the host 20 uses the tiered storage system 10 via the host interface bus 30.

The tiered storage system 10 includes a high-speed storage device (first storage device) 11, a low-speed storage device (second storage device) 12 and the storage controller 13. The high-speed storage device 11 and the low-speed storage device 12 are connected to the storage controller 13 via a storage interface bus 14. In the embodiment, the storage interface bus 14 is an FC (fibre channel). However, the storage interface bus 14 may be an interface bus other than the FC, like the host interface bus 30.

The high-speed storage device 11 includes, for example, a single solid-state drive (SSD) that is compatible with a hard disk drive (HDD) and has a higher access speed than the HDD (that is, the SSD is excellent in access performance). In contrast, the low-speed storage device 12 includes, for example, a single HDD.

Therefore, in the embodiment, the low-speed storage device 12 has a lower access speed than the high-speed storage device 11 (that is, the device 12 is degraded in access performance). Assume, in contrast, that the storage capacity of the low-speed storage device 12 is larger than that of the high-speed storage device 11. In the embodiment, the high-speed storage device 11 is used as a storage device of a higher tier (high-speed tier, first tier), and the low-speed storage device 12 is used as a storage device of a lower tier (low-speed tier, second tier). The tiered storage system 10 may further include a storage device of a lower speed (tier) than the low-speed storage device 12 (a storage device of a third tier).

Further, unlike the embodiment, the high-speed storage device 11 may be a flash array storage device provided with flash memories, or a storage device called an all-flash array. Similarly, the low-speed storage device 12 may be a storage device of an array structure including a plurality of HDDs.

Furthermore, the high-speed storage device 11 may include a high-speed HDD, such as an HDD for FC, and the low-speed storage device 12 may include a low-speed HDD, such as an HDD for SATA. The low-speed storage device 12 may be an optical disk drive, such as a Blue-ray Disc (registered trademark) drive, or a DVD (registered trademark) drive, or a tape device. If a tape device is used as the low-speed storage device 12, an optical disk drive may be used as the high-speed storage device 11.

The storage controller 13 receives, from the host 20, a request (input/output request) of access (read access or write access) using a logical address, and executes the requested input/output. When executing the input/output, the storage controller 13 converts a logical address into a physical address, using a well-known address translation function. The logical address represents an address in the logical disk. The physical address represents the physical position of a storage area that is included in the high-speed storage device 11 or the low-speed storage device 12, and is associated with the logical address. The storage controller 13 accesses the high-speed storage device 11 or the low-speed storage device 12, based on the physical address.

The storage controller 13 includes a host interface controller (hereinafter, referred to as the HIF controller) 131, a storage interface controller (hereinafter, referred to as the SIF controller) 132, a memory 133, a local HDD 134 and a CPU 135.

The HIF controller 131 controls data transfer (data transfer protocol) between the HIF controller 131 concerned and the host 20. The HIF controller 131 receives the input/output request (a read or write request) from the host, and returns a response to the input/output request. This input/output (I/O) request designates reading or writing data from or to the logical disk (namely, access to the logical disk). Upon receiving the I/O (access) request from the host 20, the HIF controller 131 transmits the I/O request to the CPU 135. The CPU 135 having received the I/O request processes the I/O request.

The SIF controller 132 receives, from the CPU 135, an access request (more specifically, a read or write request to the high-speed storage device 11 or the low-speed storage device 12) corresponding to the I/O request output from the host 20 to the CPU 135. In accordance with the received access request, the SIF controller 132 accesses the high-speed storage device 11 or the low-speed storage device 12.

The memory 133 is a rewritable volatile memory such as a DRAM. Part of the storage area of the memory 133 is used for storing a control program (for example, a firmware program) loaded from the local HDD 134. Another part of the storage area of the memory 133 is used for storing an address translation table 1331, a duplication management table 1332, and an input/output (I/O) statistics table 1333 (FIG. 2), which are loaded from the local HDD 134.

The local HDD 134 stores the firmware program. When the storage controller 13 is started, the CPU 135 loads at least part of the firmware program from the local HDD 134 into the memory 133 by executing an initial program loader (IPL). The IPL is stored in a nonvolatile memory, such as a ROM or a flash ROM (FROM).

In accordance with the firmware program loaded into the memory 133, the CPU 135 functions as a configuration management unit 1361, an input/output (I/O) controller 1362, a deduplication controller 1363, an input/output (I/O) management unit 1364 and a tiering controller 1365 (FIG. 2). That is, the CPU 135 controls the whole tiered storage system 10 by executing the firmware program stored in the memory 133.

In the embodiment, the storage controller 13 is independent of the host 20 as shown in FIG. 1. However, the storage controller 13 may be incorporated in the host 20. In this case, the storage controller 13 (more specifically, the functionality of the storage controller 13) may be realized by part of the functionality of the operating system (OS) of the host 20.

The storage controller 13 may be incorporated in a card that is to be inserted for use in a card slot of the host 20. Alternatively, part of the storage controller 13 may be incorporated in the host 20, and the remaining part of the same may be included in the card. Further, part or all of the host 20, the storage controller 13, and the high-speed and low-speed storage devices 11 and 12 may be housed in a single housing.

FIG. 2 is a block diagram mainly showing an exemplary functional configuration of the storage controller 13 of FIG. 1. The storage controller 13 includes firmware 136. The firmware 136 is realized when the CPU 135 executes the firmware program. The firmware 136 includes a configuration management unit 1361, the I/O controller 1362, the deduplication controller 1363, the I/O management unit 1364, and the tiering controller 1365. At least the configuration management unit 1361, the I/O controller 1362, the deduplication controller 1363, the I/O management unit 1364, or the tiering controller 1365 may be realized by hardware.

The configuration management unit 1361 manages the storage configuration of the tiered storage system 10. This configuration management includes constructing a logical disk including a virtualized storage area (namely, a logical storage area), based on the storage area of the high-speed and low-speed storage devices 11 and 12, and providing the logical disk to the host 20.

In the embodiment, in order to construct (and manage) the logical disk, the storage area (logical storage area) of the logical disk is divided into small areas of a certain size called logical chunks. Similarly, the storage areas (physical storage areas) of the high-speed and low-speed storage devices 11 and 12 are each divided into areas called physical extents and having a size greater than the logical chunk. Each physical extent is further divided into small areas called physical chunks and having the same size as the logical chunk. That is, each physical extent includes a predetermined number of continuous physical chunks.

The size (namely, extent size) of the physical extent is, for example, 8 megabytes (MB), i.e., 8,388,608 bytes (B). The size (namely, chunk size) of the logical and physical chunks is, for example, 4 kilobytes (KB), i.e., 4,096 bytes (B). However, the extent and chunk sizes are not limited to 8 MB and 4 KB, respectively.

The configuration management further includes allocating physical chunks in the storage areas of the high-speed and low-speed storage devices 11 and 12 to logical chunks in the storage area of the logical disk, and managing the state of the allocation. The address translation table 1331 is used for managing the state of the allocation.

In accordance with an I/O request (access) from the host 20 for data reading, the I/O controller 1362 reads data from the high-speed storage device 11 or the low-speed storage device 12. Further, in accordance with an I/O request (access) from the host 20 for data writing, the I/O controller 1362 writes data to the high-speed storage device 11 or the low-speed storage device 12.

The deduplication controller 1363 excludes, physical chunk by physical chunk, so-called data duplication that data items of the same content are stored in a plurality of physical chunks. To this end, when data (first data) is virtually written to a certain logical chunk (first logical chunk), the deduplication controller 1363 determines whether data of the same content as the first data is already stored in the high-speed storage device 11 or the low-speed storage device 12. This determination is called duplication determination, and is executed by comparing the hash value of the first data with the hash values of data items stored in the physical chunks of the high-speed storage device 11 and the low-speed storage device 12. The hash values of the data items stored in the physical chunks are managed using the duplication management table 1332.

Assume here that the hash value of certain data (second data) in the high-speed storage device 11 or the low-speed storage device 12 is equal to the hash value of the first data, and that the second data is stored in a first physical chunk allocated to at least one logical chunk (for example, a second logical chunk) different from the first logical chunk. In this case, the deduplication controller 1363 also allocates the first physical chunk to the first logical chunk, and prevents the first data from being actually written to the high-speed storage device 11 or the low-speed storage device 12. Access to the first logical chunk is realized by physically accessing the first physical chunk. Access to the second logical chunk is also realized by physically accessing the first physical chunk.

The I/O management unit 1364 manages I/O corresponding to an I/O request from the host 20. This I/O management includes, for example, acquiring an I/O (access) statistic (hereinafter, referred to as the I/O count) that indicates the situation of access to each logical chunk in a certain period. The I/O count in each logical chunk is managed using an I/O statistics table 1333.

The tiering controller 1365 relocates the data of a physical chunk of a high access frequency in the low-speed storage device 12 to a physical chunk in the high-speed storage device 11. Further, the tiering controller 1365 relocates the data of a physical chunk of a low access frequency in the high-speed storage device 11 to a physical chunk in the low-speed storage device 12. For this relocation, the tiering controller 1365 acquires the I/O count of each physical chunk. In particular, if a single physical chunk is allocated to a plurality of logical chunks for deduplication, the tiering controller 1365 acquires the sum of the I/O counts of the plurality of logical chunks as the I/O count of the single physical chunk. Allocation of a single physical chunk to a plurality of logical chunks can be paraphrased such that the single physical chunk is referred to by the plurality of logical chunks.

FIG. 3 shows an exemplary relationship between physical extents and physical chunks in the embodiment, and an exemplary relationship between the physical chunks and logical chunks. As shown in FIG. 3, the storage area of the high-speed storage device 11 is divided into m physical extents PE0_0 to PE0_m−1 including physical extent PE0_i. Similarly, the storage area of the low-speed storage device 12 is divided into n physical extents PE1_0 to PE1_n−1 including physical extent PE1_j. That is, the high-speed storage device 11 and the low-speed storage device 12 include physical extents PE0_0 to PE0_m−1 and physical extents PE1_0 to PE1_n−1, respectively.

Physical extent PE0_i is indicated by, for example, storage identifier (ID) (=SID=SID0=0), and extent (physical extent) ID (=PEID=PEIDi). SID=SID0=0 represents the high-speed storage device 11. PEID=PEIDi is unique ID in the storage device (namely, the high-speed storage device 11) represented by SID=SID0=0, and represents the i-th physical extent in the storage device.

Physical extent PE1_j is indicated by, for example, storage ID (=SID=SID1=1) and extent ID (=PEID=PEIDj). SID=SID1=1 represents the low-speed storage device 12. PEID=PEIDj is unique ID in the storage device (namely, the low-speed storage device 12) represented by SID=SID1=1, and represents the j-th physical extent in the storage device.

Physical extent PE0_i is divided into p physical chunks PCi_0 to PCi_p−1 including physical chunk PCi_x, and physical extent PE1_j is divided into p physical chunks PCj_0 to PCj_p−1 including physical chunk PCj_y. That is, physical extents PE0_i and PE1_j include physical chunks PCi_0 to PCi_p−1 and PCj_0 to PCj_p−1, respectively.

The positions (namely, relative positions) of physical chunks PCi_0 to PCi_p−1 in physical extent PE0_i are represented by offsets OFST0 to OFSTp_−1 in physical extent PE0_i. Similarly, the positions (relative positions) of physical chunks PCj_0 to PCj_p−1 in physical extent PE1_j are represented by offsets OFST0 to OFSTp−1 in physical extent PE1_j.

Therefore, for example, physical chunk PCi_x is represented by storage ID (=SID=SID0=0), extent ID (=PEID=PEIDi) and offset OFSTx. Similarly, physical chunk PCj_y is represented by storage ID (=SID=SID1=1), extent ID (=PEID=PEIDj) and offset OFSTy. That is, the combination of storage ID, extent ID and an offset represents a physical address. In the embodiment, physical chunks PCi_x and PCj_y are also represented by unique physical chunk IDs (PCIDα and PCIDβ) in the tiered storage system 10.

FIG. 3 also shows two logical disks 137 and 138. Logical disks 137 and 138 are constructed by the configuration management unit 1361 in the storage controller 13, and are provided to the host 20. The storage area of logical disk 137 is divided into a plurality of logical chunks including logical chunk LC0_u, and the storage area of logical disk 138 is divided into a plurality of logical chunks including logical chunk LC1_v.

Logical chunk LC0_u is represented by logical disk ID (=LDID=LDID0=0) and logical block address (LBA=LBAr), and logical chunk LC1_v is represented by logical disk ID (=LDID=LDID1=1) and logical block address (LBA=LBAs). LDID=LDID0=0 represents logical disk 137, and LDID=LDID1=1 represents logical disk 138. LBA=LBAr represents the logical block address of the head position of logical chunk LC0_u in logical disk 137, and LBA=LBAs represents the logical block address of the head position of logical chunk LC1_v in logical disk 138. That is, the combination of logical disk ID (LDID) and a logical block address (LBA) represents a logical address.

In the example of FIG. 3, physical chunk PCi_x is allocated to logical chunk LC1_v as indicated by arrow 301. Moreover, physical chunk PCj_y is allocated to logical chunk LC0_u as indicated by arrow 302.

FIG. 4 shows a data structure example of the address translation table 1331 shown in FIG. 2. The address translation table 1331 includes two tables 1331a and 1331b. Each entry of table 1331a includes a logical disk ID field, an LBA field and a physical chunk ID field, and is used to hold the combination of the logical disk ID (LDID), the LBA and the physical chunk ID (PCID). That is, in each entry of table 1331a, the combination of the logical disks ID and the LBA is associated with the physical chunk ID.

In FIG. 4, the head entry of table 1331a holds LDID0, LBA0 and PCID0 in the logical disk ID field, the LBA field and the physical chunk ID field, respectively. In this case, the head entry of table 1331a indicates that a physical chunk indicated by PCID0 is allocated to a logical chunk in logical disk 137 represented by LDID0 and LBA0. Similarly, the second entry of table 1331a holds LDID0, LBA1 and an invalid value in the logical disk ID field, the LBA field and the physical chunk ID field, respectively. In FIG. 4, the invalid value is denoted by a sign "-", and indicates that corresponding effective data (namely, PCID) is not set. In this case, the second entry of table 1331a indicates that no physical chunk is allocated to the logical chunk in logical disk 137 represented by LDID0 and LBA1. In order to indicate that effective information (PCID) is not set, the corresponding field (physical chunk ID field) may be set to be blank.

Each entry of table 1331b includes a physical chunk ID field, a storage ID field, an extent ID field and an offset field, and is used for holding a combination of physical chunk ID (PCID), storage ID (SID), extent ID (PEID) and the offset (OFST). That is, in each entry of table 1331b, the physical chunk ID is associated with the combination of the storage ID, the extent ID and the offset.

In FIG. 4, the head entry of table 1331b holds PCID0, SID0, PEID0 and OFST0 in the physical chunk ID field, the storage ID field, the extent ID field and the offset field. In this case, the head entry of table 1331b indicates that the physical chunk represented by PCID0 is a physical chunk in the high-speed storage device 11 represented by SID0, PEID0 and OFST0. As is evident from the data structure of the above-described address translation table 1331, the address translation table 1331 is used for translating the address (logical address) of the logical chunk represented by the combination of the logical disk ID and the LBA into the address (physical address) of the physical chunk represented by the combination of the storage ID, the extent ID and the offset.

FIG. 5 shows a data structure example of the duplication management table 1332 shown in FIG. 2. Each entry of the duplication management table 1332 includes a physical chunk ID field, a hash value field, and a duplication count field, and is used for holding a combination of physical chunk ID (PCID), a hash value (H) and a duplication count (DCNT). "H" represents the hash value of the data of a physical chunk indicated by PCID. That is, in the embodiment, the hash value of the data of a physical chunk is used as a representative value for specifying the content of the data. Further, a well-known hash function, such as SHA-256, is used for calculating the hash value.

In FIG. 5, the head entry of the duplication management table 1332 holds PCID0, Ha and DCNTc in the physical chunk ID field, the hash value field and the duplication count field, respectively. In this case, the head entry of the duplication management table 1332 indicates that the hash value of the data of a physical chunk represented by PCID0 is Ha, and that the duplication count (namely, the number of duplications) of the data is DCNTc. Duplicate count DCNTc indicates that the physical chunk represented by PCID0 is allocated to a number DCNTc of logical chunks, i.e., is referred to by DCNTc logical chunks.

The second entry of the duplication management table 1332 holds PCID1, an invalid value (H="-"), and 0 (DCNT=0) in the physical chunk ID field, the hash value field and the duplication count field, respectively. In this case, the second entry of the duplication management table 1332 indicates that the physical chunk represented by PCID1 does not have effective data, i.e., the physical chunk represented by PCID1 is a free chunk.

FIG. 6 shows a data structure example of the I/O statistics table 1333 shown in FIG. 2. Each entry of the I/O statistics table 1333 includes a logical disk ID field, an LBA field and an I/O count field, and is used for holding a combination of logical disk ID (LDID), an LBA and an I/O count. The I/O count indicates the number of accesses to a logical chunk represented by the combination of LDID and LBA. The I/O statistics table 1333 is used for, for example, processing (relocation processing) for data relocation by the tiering controller 1365.

In the embodiment, the content of the I/O statistics table 1333 used for the relocation processing is saved as an old-I/O-statistics table in, for example, the local HDD 134 until subsequent relocation processing is started. However, an old-IO-count field may be added to each entry of the I/O statistics table 1333. This old I/O count field is used for holding, as an old I/O count, an I/O count obtained when latest relocation processing is finished.

FIG. 7 shows a deduplication example in the embodiment. In FIG. 7, the high-speed and low-speed storage devices 11 and 12 of the tiered storage system 10 include a plurality of rectangular frames indicated by the solid lines. The rectangular frames indicated by the solid lines express physical chunks, and characters in the rectangular frames indicate data stored in the physical chunks. FIG. 7 also shows logical disks 137 and 138. In logical disks 137 and 138, a plurality of rectangular frames are indicated by the broken lines. The rectangular frames indicated by the broken lines are logical chunks, and characters in the rectangular frames indicate data virtually stored in the logical chunks. In the example of FIG. 7, a physical chunk included in the high-speed storage device 11 and storing data A is allocated to one logical chunk in logical disk 137, and to two logical chunks in logical disk 138, as is indicated by broken-line arrows. This prevents data A from being duplicated in the high-speed storage device 11 or the low-speed storage device 12.

A description will now be given of the operation of the embodiment. Referring first to FIG. 8, write processing performed when the HIF controller 131 of the storage controller 13 receives a write command WC from the host 20 will be described. FIG. 8 is a flowchart showing an exemplary procedure of write processing in the embodiment.

In general, a write command WC (and a read command described later) includes logical disk ID (=LDID=LDIDa), an LBA (=LBAb), and data on a data transfer size, and the data transfer size is expressed in terms of a block size that is several times the chunk size. In order to simplify the description, it is assumed in the embodiment that the block size is equal to the chunk size, and the data transfer size is equal to one block size (namely, one chunk size).

The deduplication controller 1363 of the storage controller 13 calculates hash value Hc of write data WD to be written in accordance with the write command WC (step S1). Next, the deduplication controller 1363 refers to the duplication management table 1332 based on hash value Hc, and thus performs an operation of searching the duplication management table 1332 for an entry (target entry) including a hash value equal to hash value Hc (step S2). Subsequently, the deduplication controller 1363 determines whether the target entry has been detected (step S3).

If the target entry has not been detected (No in step S3), the deduplication controller 1363 determines that data of the same content as the write data WD exists in neither the high-speed storage device 11 nor the low-speed storage device 12, and therefore that deduplication associated with the write data WD is not needed. In this case, the deduplication controller 1363 performs, as described below, an operation of specifying a physical chunk allocated to logical chunk LCc to which the write data WD is to be virtually written (namely, logical chunk LCc designated to be written to) (step S4). Logical chunk LCc is designated by a combination (logical address) of LDIDa and LBAb (for designating the write command WC) included in (i.e., designated by) the write command WC.

First, the deduplication controller 1363 refers to the table 1331a in the address translation table 1331, based on the above-mentioned combination of LDIDa and LBAb. After that, the deduplication controller 1363 specifies a physical chunk allocated to logical chunk LCc designated by the combination of LDIDa and LBAb, by searching table 1331a for valid physical chunk ID associated with the combination of LDIDa and LBAb.

Next, the deduplication controller 1363 determines, as described below, whether the physical chunk allocated to the logical chunk LCc has been specified (step S5). First, if valid physical chunk ID associated with the combination of LDIDa and LBAb has not been detected, the deduplication controller 1363 determines that no physical chunk is allocated to logical chunk LCc. In this case, the deduplication controller 1363 determines that a physical chunk allocated to logical chunk LCc has not been specified (No in step S5).

In contrast, if the valid physical chunk ID has been detected, the deduplication controller 1363 refers to table 1331b in the address translation table 1331, based on the detected physical chunk ID. As a result, the deduplication controller 1363 acquires a combination of storage ID, extent ID and an offset associated with the detected physical chunk ID. That is, the deduplication controller 1363 translates the combination (logical address) of LDIDa and LBAb into the combination (physical address) of the storage ID, the extent ID and the offset. The combination of the storage ID, the extent ID and the offset represents physical chunk PCd allocated to logical chunk LCc designated by the combination of LDIDa and LBAb. In this case, the deduplication controller 1363 determines that a physical chunk (i.e., physical chunk PCd) allocated to logical chunk LCc has been specified (Yes in step S5).

If physical chunk PCd has been specified (Yes in step S5), the deduplication controller 1363 refers to duplication count DCNTd included in an entry of the duplication management table 1332 associated with the physical chunk ID of specified physical chunk PCd (step S6). If physical chunk PCd is allocated at least to logical chunk LCc, duplication count DCNTd is at least 1.

Subsequently, the deduplication controller 1363 determines whether duplication count DCNTd is 1 (step S7). If duplication count DCNTd is 1 (Yes in step S7), the deduplication controller 1363 determines that specified physical chunk PCd is allocated only to logical chunk LCc. That is, the deduplication controller 1363 determines that the data currently stored in physical chunk PCd is not referred to by a logical chunk other than logical chunk LCc, and differs from data virtually stored in logical chunks other than logical chunk LCc. In this case, the deduplication controller 1363 causes the I/O controller 1362 to write the write data WD to specified physical chunk PCd (step S8). After that, the I/O management unit 1364 increments, by one, the I/O count in an entry of the I/O statistics table 1333 associated with logical chunk LCc (more specifically, the combination of LDIDa and LBAb indicating logical chunk LCc) (i.e., an entry including the combination of LDIDa and LBAb) (step S9). This is the termination of the write processing.

In contrast, if duplication count DCNTd is not 1 (i.e., if duplication count DCNTd exceeds 1) (No in step S7), the deduplication controller 1363 determines that specified physical chunk PCd is also allocated to at least one logical chunk other than logical chunk LCc. That is, the deduplication controller 1363 determines that the data currently stored in physical chunk PCd is also referred to by at least one logical chunk other than logical chunk LCc. In this case, the deduplication controller 1363 determines that the write data WD should be written to a free physical chunk different from physical chunk PCd.

To this end, the deduplication controller 1363 decrements, by one, duplication count DCNTd (step S10). After that, the deduplication controller 1363 executes new-chunk selection processing for selecting a free chunk, to be newly allocated to logical chunk LCc, from either the high-speed storage device 11 or the low-speed storage device 12 (step S11). Assume in the embodiment that physical chunk PCe has been selected. At this time, the content of the hash value field and the duplication count field associated with the physical chunk ID of the physical chunk PCe in the duplication management table 1332 is an invalid value ("-") and 0 (i.e., initial values), respectively.

The deduplication controller 1363 causes the I/O controller 1362 to write the write data WD to the selected physical chunk PCe (step S12). Subsequently, the deduplication controller 1363 sets calculated hash value (namely, the hash value of the write data WD) Hc and 1 in the hash value field and the duplication count field of an entry of the duplication management table 1332 associated with the physical chunk ID of physical chunk PCe (new chunk), respectively (step S13). That is, the deduplication controller 1363 updates the hash value and the duplication count in the entry of the duplication management table 1332 associated with the new chunk, from an invalid value ("-") and 0 to Hc and 1, respectively.

Next, the deduplication controller 1363 updates the content of an entry of the address translation table 1331 associated with logical chunk LCc (step S14). That is, in table 1331a of the address translation table 1331, the deduplication controller 1363 updates physical chunk ID in an entry including a combination of LDIDa and LBAb that indicates logical chunk LCc, from the physical chunk ID of physical chunk PCd to the physical chunk ID of physical chunk PCe. At this time, the I/O management unit 1364 increments, by 1, the I/O count in the entry of the I/O statistics table 1333 associated with logical chunk LCc (step S9).

In contrast, if the target entry has been detected (Yes in step S3), the deduplication controller 1363 determines that data of the same content as the write data WD exists in a physical chunk in either the high-speed storage device 11 or the low-speed storage device 12, and hence that it is necessary to perform deduplication associated with the write data WD. In this example, assume that data of the same content as the write data WD exists in physical chunk PCf.

At this time, the deduplication controller 1363 prevents, for deduplication, the writing of the write data WD to the new physics chunk by the I/O controller 1362. After that, the deduplication controller 1363 increments, by 1, a duplication count in the entry (associated with physical chunk PCf) detected in the duplication management table 1332 (step S15).

After executing step S15, the deduplication controller 1363 proceeds to step S14. In step S14, the deduplication controller 1363 updates the content of an entry of the address translation table 1331 associated with logical chunk LCc. That is, in table 1331a of the address translation table 1331, the deduplication controller 1363 sets the physical chunk ID of physical chunk PCf in the physical chunk ID field of the entry including the combination of LDIDa and LBAb that indicates logical chunk LCc. Thus, as a result of newly allocating physical chunk PCf to logical chunk LCc, the number of logical chunks to which physical chunk PCf is allocated (that is, the number of logical chunks referring to physical chunk PCf) increases by 1. When the deduplication controller 1363 has executed step S14, the I/O management unit 1364 increments, by 1, the I/O count in the entry of the I/O statistics table 1333 associated with logical chunk LCc (step S9).

Assume here that when steps S15 and S14 are executed as described above because the determination result of step S3 is Yes, a physical chunk such as physical chunk PCd, which differs from physical chunk PCf, is already allocated to logical chunk LCc. In this case, the deduplication controller 1363 executes, in step S14 as described below, processing of updating the duplication management tables 1332, in addition to the above-described processing of updating the address translation table 1331.

The entry of the duplication management table 1332 associated with physical chunk PCd will hereinafter be referred to as a specific entry. Since physical chunk PCd is allocated to logical chunk LCc immediately before steps S15 and S14 are executed, the duplication count in the specific entry is 1 or more. If the duplication count in the specific entry is 1, the deduplication controller 1363 updates the hash value and the duplication count in the specific entry to the invalid value ("-") and 0, respectively. In contrast, if the duplication count in the specific entry exceeds 1, the deduplication controller 1363 decrements the duplication count by 1.

Assume here that the deduplication controller 1363 could not specified a physical chunk allocated to logical chunk LCc (No in step S5). In this case, the deduplication controller 1363 determines that no valid physical chunk is allocated to logical chunk LCc. Therefore, the deduplication controller 1363 selects a free physical chunk (new chunk) to be newly allocated to logical chunk LCc (step S16). In the embodiment, a free physical chunk in the low-speed storage device 12 is selected as the new chunk. However, a free physical chunk in the high-speed storage device 11 may be selected as the new chunk. Further, the user, for example, may beforehand designate this type of selection rule via the host 20. In the embodiment, physical chunk PCg has been selected.

The deduplication controller 1363 causes the I/O controller 1362 to write the write data WD to selected physical chunk PCg (step S12). Further, the deduplication controller 1363 sets calculated hash value Hc and 1 in the hash value field and the duplication count field of an entry of the duplication management table 1332 associated with the physical chunk ID of physical chunk PCg (new chunk), respectively (step S13).

Further, the deduplication controller 1363 updates the content of an entry of the address translation table 1331 associated with logical chunk LCc (step S14). That is, in table 133a of the address translation table 1331, the deduplication controller 1363 updates, to the physical chunk ID of physical chunk PCg, the physical chunk ID (="-") in an entry including the combination of LDIDa and LBAb that designates logical chunk LCc. At this time, the I/O management unit 1364 increments, by 1, the I/O count in an entry of the I/O statistics table 1333 associated with logical chunk LCc (step S9).

Figure 9:
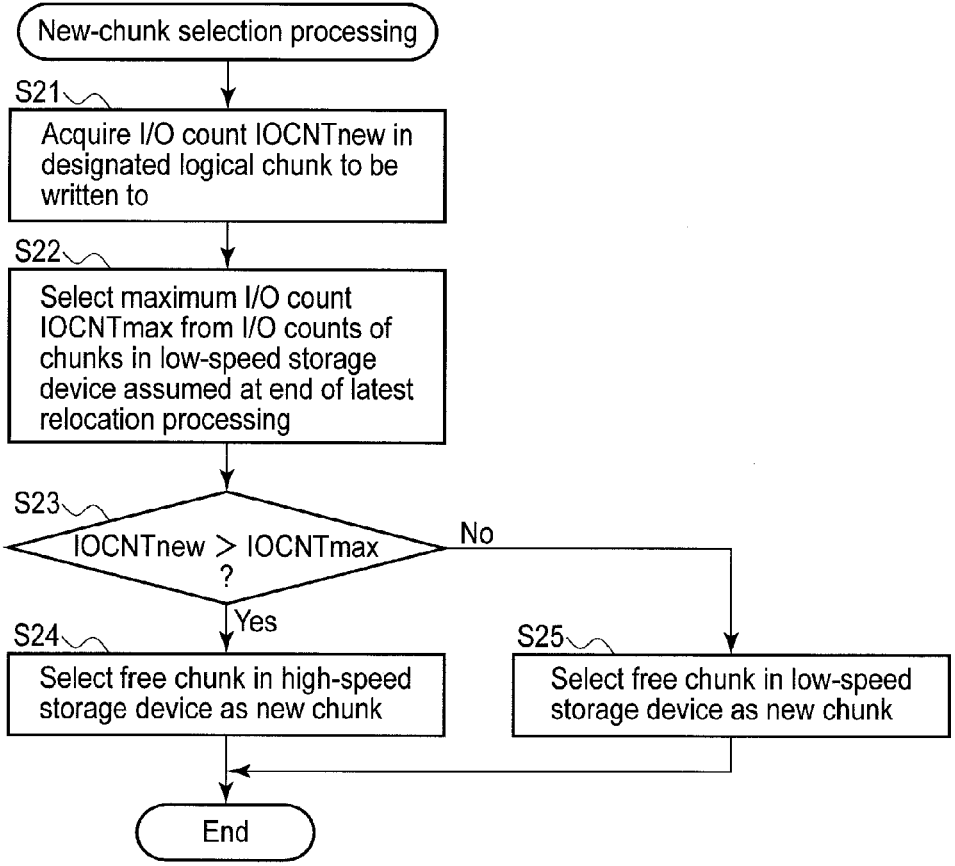
FIG. 9 is a flowchart showing an exemplary procedure of new-chunk selection processing in the write processing shown in FIG. 8.

Referring then to FIG. 9, a description will be given of new-chunk selection processing (step S11) in the write processing shown in FIG. 8. FIG. 9 is a flowchart showing an exemplary procedure of the new-chunk selection processing.

First, the deduplication controller 1363 acquires the I/O count (=I/OCNTnew) in the entry of the I/O statistics table 1333 associated with the combination of LDIDa and LBAb that represents logical chunk LCc (namely, logical chunk LCc designated to be written to) (step S21). Subsequently, the deduplication controller 1363 selects a maximum I/O count (=I/OCNTmax) from the I/O counts of the respective physical chunks in the low-speed storage device 12, obtained when latest relocation processing has finished (step S22). The deduplication controller 1363 acquires the I/O counts of the physical chunks in the low-speed storage device 12 by calculating the sum totals of the I/O counts of all logical chunks to which the respective physical chunks are allocated. For calculation of the sum total, the deduplication controller 1363 uses the I/O statistics table 1333 obtained when the latest relocation processing has finished, i.e., an old I/O statistics table.

Next, the deduplication controller 1363 compares IOCNTnew with IOCNTmax, and then determines, for example, whether IOCNTnew is greater than IOCNTmax (step S23). If IOCNTnew is greater than IOCNTmax (Yes in step S23), the deduplication controller 1363 determines that the frequency of access to logical chunk LCc is sufficiently high. In this case, the deduplication controller 1363 selects, as a new chunk, a free physical chunk in the high-speed storage device 11 (step S24), and then terminates the new-chunk selection processing (step S11 of FIG. 8).

In contrast, if IOCNTnew is not greater than IOCNTmax (No in step S23), the deduplication controller 1363 determines that the frequency of access to logical chunk LCc is low. In this case, the deduplication controller 1363 selects a free physical chunk in the low-speed storage device 12 as a new chunk (step S25), and then terminates the new-chunk selection processing (step S11 of FIG. 8).

Figure 10:
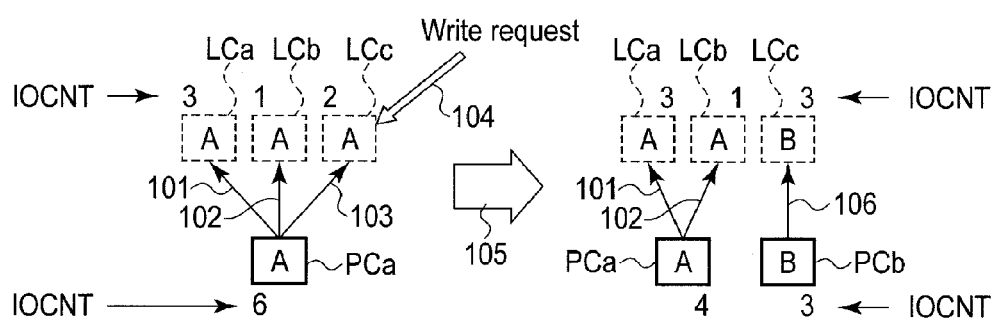
FIG. 10 is a view for explaining exemplary takeover of an I/O count performed when a physical chunk selected in the new-chunk selection processing is allocated to a logical chunk, a data write to which is designated.

Referring then to FIG. 10, a description will be given of exemplary takeover of an I/O count performed when the deduplication controller 1363 allocates, to a logical chunk, a data write to which is designated, a physical chunk selected as a new chunk in the new-chunk selection processing (step S11 of FIG. 8). In FIG. 10, physical chunk PCa is allocated to logical chunks LCa, LCb, and LCc, as is indicated by arrows 101,102 and 103. Data A is stored in physical chunk PCa. In this case, data A is virtually stored in logical chunks LCa, LCb and LCc.

In the embodiment, the IOCNT (I/O count) of physical chunk PCa is expressed by the sum total of the IOCNTs (I/O counts) of logical chunks LCa, LCb and LCc to which physical chunk PCa is allocated. In FIG. 10, the I/O counts (IOCNTs) of logical chunk LCa, LCb and LCc are 3, 1, and 2, respectively. Accordingly, the IOCNT of physical chunk PCa is 6.

Assume that in this state, a write of data B to logical chunk LCc has been requested as indicated by arrow 104. Assume also that in the new-chunk selection processing shown by the flowchart of FIG. 9, physical chunk PCb is selected as a new chunk to be allocated to logical chunk LCc. In this case, the number of allocation destinations of physical chunk PCa decreases to two, i.e., logical chunks LCa and LCb, as indicated by arrow 105. Further, instead of physical chunk PCa, physical chunk PCb is allocated to logical chunk LCc, as indicated by arrow 106.

Data B is written to physical chunk PCb. Accordingly, data B is virtually written to logical chunk LCc. As a result, the IOCNT of logical chunk LCc is incremented from 2 to 3. At this time, the tiering controller 1365 takes over the incremented IOCNT (=3) of logical chunk LCc as the IOCNT of physical chunk PCb. That is, the incremented IOCNT (=3) of logical chunk LCc is taken over as the IOCNT of physical chunk PCb. In contrast, the IOCNT of physical chunk PCa decreases to the sum total (=4) of the IOCNTs (3 and 1) of logical chunks LCa and LCb.

Referring next to FIG. 11, a description will be given of an exemplary takeover of an I/O count performed when a data write to a physical chunk is prevented for deduplication, i.e., when the number of logical chunks allocated to the physical chunk increases by 1. In FIG. 11, it is assumed that physical chunk PCb is in a state obtained after data B is written as shown in FIG. 10. In this state, physical chunk PCa is allocated to logical chunks LCa and LCb as indicated by arrows 101 and 102, and physical chunk PCb is allocated to logical chunk LCc as indicated by arrow 106. Physical chunk PCa stores data A, and physical chunk PCb stores data B. In this case, data A is virtually stored in logical chunks LCa and LCb, and data B is virtually stored in logical chunk LCc. The IOCNT of physical chunk PCa is expressed by the sum total (4) of the IOCNTs (3 and 1) of logical chunks LCa and LCb, to which physical chunk PCa is allocated. In contrast, the IOCNT of physical chunk PCc is expressed by the IOCNT (3) of logical chunk LCc, to which physical chunk PCc is allocated.

Assume here that a write of data A to logical chunk LCc has been requested as indicated by arrow 107. Data A already exists in physical chunk PCa. Therefore, the deduplication controller 1363 prevents, for deduplication, data A from being written to physical chunk PCb currently allocated to logical chunk LCc. In this case, the number of allocation destinations of physical chunk PCa increases to three, i.e., logical chunks LCa, LCb and LCc, as is indicated by arrow 108. That is, physical chunk PCa is also allocated to logical chunk LCc as indicated by arrow 109. Thereby, data A is virtually written to logical chunk LCc, although it is not written to a new physical chunk. As a result, the IOCNT of logical chunk LCc is incremented from 3 to 4. In this case, the tiering controller 1365 takes over, as the IOCNT of physical chunk PCa, a value (8) obtained by adding the incremented IOCNT (4) of logical chunk LCc to the IOCNT (4) of physical chunk PCa assumed before the write of data A is requested. That is, the IOCNT of physical chunk PCa takes over the sum total (8) of the value (4) before the write of data A is requested, and the incremented IOCNT (4) of logical chunk LCc. Thus, the IOCNT of physical chunk PCa is increased by the incremented IOCNT (4) of logical chunk LCc.

Referring then to FIG. 12, a description will be given of read processing performed in the embodiment when the HIF controller 131 receives a read command RC from the host 20. FIG. 12 is a flowchart showing an exemplary procedure of read processing in the embodiment.

Assume first that the read command RC instructs a data read (virtual data read) from logical chunk LCh. In this case, the I/O controller 1362 of the storage controller 13 specifies a physical chunk allocated to logical chunk LCh, as in step S4 (FIG. 8) executed by the deduplication controller 1363 in the above-described write processing (step S31).

Next, the I/O controller 1362 reads data from the specified physical chunk (step S32). The read data is transmitted to the host 20 by the HIF controller 131. Then, the I/O management unit 1364 increments, by 1, the I/O count in an entry of the I/O statistics table 1333 associated with logical chunk LCh (step S33). This is the termination of the read processing.

Figure 13:
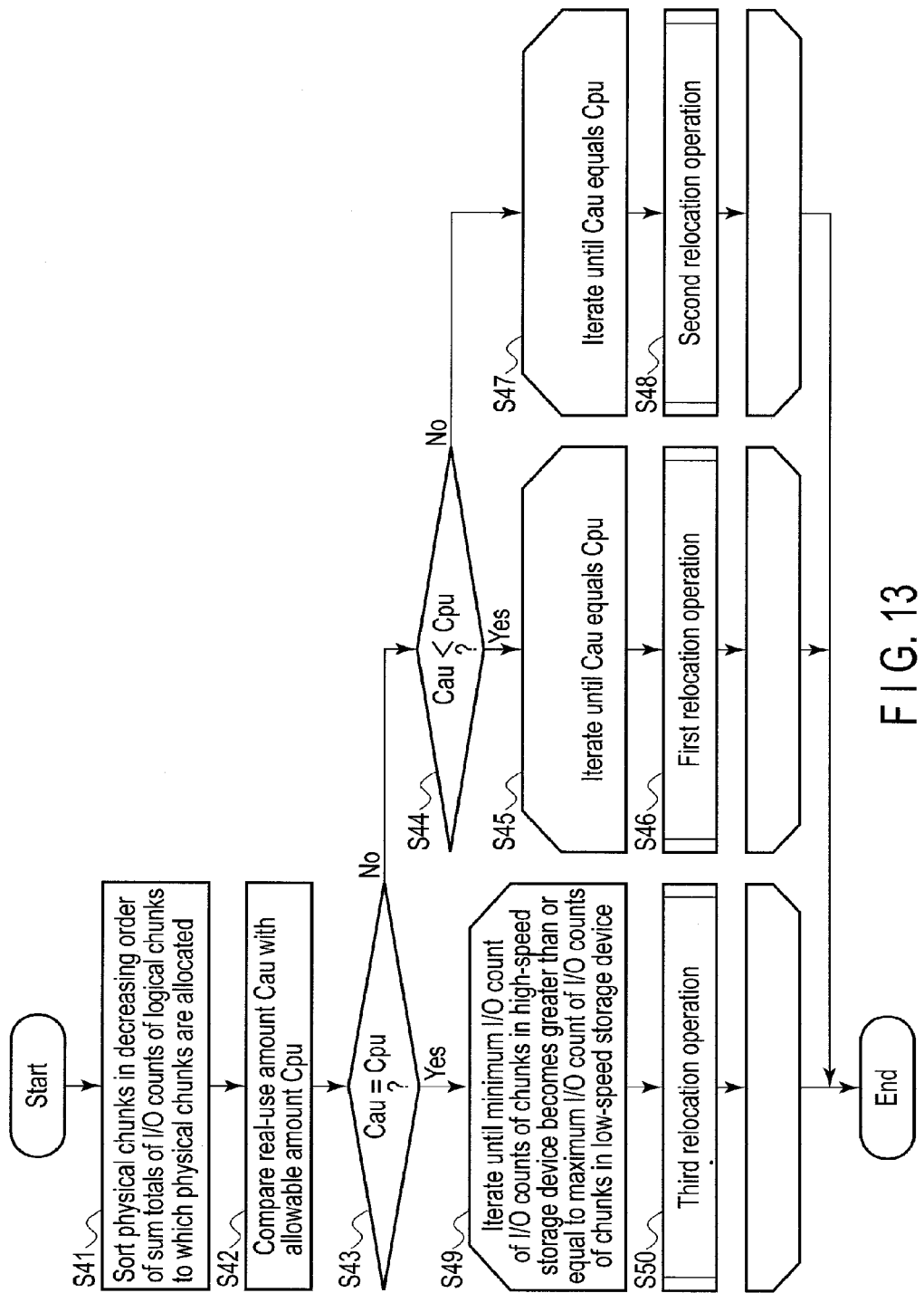
FIG. 13 is a flowchart showing an exemplary procedure of relocation processing in the embodiment.

Referring then to FIG. 13, a description will be given of relocation processing performed in the embodiment for relocating the data of a physical chunk. FIG. 13 is a flowchart showing an exemplary procedure of the relocation processing in the embodiment. This relocation processing is performed in accordance with a predetermined schedule (for example, performed periodically). However, the relocation processing may be performed at a time designated by, for example, the user via the host 20.

Assume here that the time when the relocation processing should be performed has been reached. The tiering controller 1365 performs relocation processing as follows: First, the tiering controller 1365 sorts all valid physical chunks in a decreasing order of the sum totals of the I/O counts (IOCNTs) of logical chunks to which the respective physical chunks are allocated (step S41). A method of acquiring the sum totals of the I/O counts will now be described, using, as an example, a case where physical chunk PCa is a target physical chunk, and the physical chunk ID of physical chunk PCa is PCIDa.

First, the tiering controller 1365 acquires duplication count DCNTa from an entry of the duplication management table 1332 associated with physical chunk ID=PCIDa. Assume here that duplication count DCNTa exceeds 1. The tiering controller 1365 refers to all entries of table 1331*a* in the address translation table 1331 associated with physical chunk ID=PCIDa. The number of the entries associated with physical chunk ID=PCIDa coincides with duplication count DCNTa.

The tiering controller 1365 acquires, from all entries (a number DCNTa of entries) associated with physical chunk ID=PCIDa, combinations of logical disk IDs and LBAs corresponding to all logical chunks (a number DCNTa of logical chunks) to which physical chunk PCa is allocated. The tiering controller 1365 acquires I/O counts from entries of the I/O statistics table 1333 associated with the acquired combinations of logical disk IDs and LBAs of all logical chunks. After that, the tiering controller 1365 calculates the sum total of acquired I/O counts as the I/O count of physical chunk PCa. If duplication count DCNTa is 1, only one entry of the address translation table 1331 is associated with physical chunk ID=PCIDa. In this case, the tiering controller 1365 acquires, as the I/O count of physical chunk PCa, an I/O count set in an entry of the I/O statistics table 1333 associated with the combination of logical disk ID and LBA in the above-mentioned one entry.

After executing step S41, the tiering controller 1365 compares a real-use amount Cau with an allowable amount Cpu (step S42). The real-use amount Cau refers to a capacity (first capacity) that is actually used in the high-speed storage device 11 (namely, the capacity of physical chunks allocated to logical chunks). The allowable amount Cpu refers to a (maximum) capacity (second capacity) that is allowed to be used in the high-speed storage device 11.

Next, the tiering controller 1365 determines whether the real-use amount Cau is equal to the allowable amount Cpu, based on the result of the above-mentioned comparison (step S43). If the real-use amount Cau is not equal to the allowable amount Cpu (No in step S43), the tiering controller 1365 determines whether the amount Cau is less than the amount Cpu (step S44).

If the real-use amount Cau is less than the allowable amount Cpu (Yes in step S44), the tiering controller 1365 repeats a first relocation operation (step S46) until a first condition is satisfied (step S45). After that, the tiering controller 1365 finishes the relocation processing. The first condition is that the real-use amount Cau, which is less than the allowable amount Cpu, becomes equal to the amount Cpu. The first relocation operation will be described later.

In contrast, if the real-use amount Cau is not less than the allowable amount Cpu (No in step S44), i.e., if the amount Cau exceeds the amount Cpu, the tiering controller 1365 repeats a second relocation operation (step S48) until a second condition is satisfied (step S47). After that, the tiering controller 1365 finishes the relocation processing. The second condition is that the real-use amount Cau, which exceeds the allowable amount Cpu, becomes equal to the amount Cpu. The second relocation operation will be described later.

If the real-use amount Cau is equal to the allowable amount Cpu (Yes in step S43), the tiering controller 1365 repeats a third relocation operation (step S50) until a third condition is satisfied (step S49). After that, the tiering controller 1365 finishes the relocation processing. The third condition is that the minimum I/O count of the I/O counts of valid physical chunks in the high-speed storage device 11 becomes greater than or equal to the maximum I/O count of the I/O counts of valid physical chunks in the low-speed storage device 12. The valid physical chunk refers to a physical chunk currently allocated to a logical chunk, i.e., a physical chunk that is not free. The third relocation operation will be described later.

Figure 14:
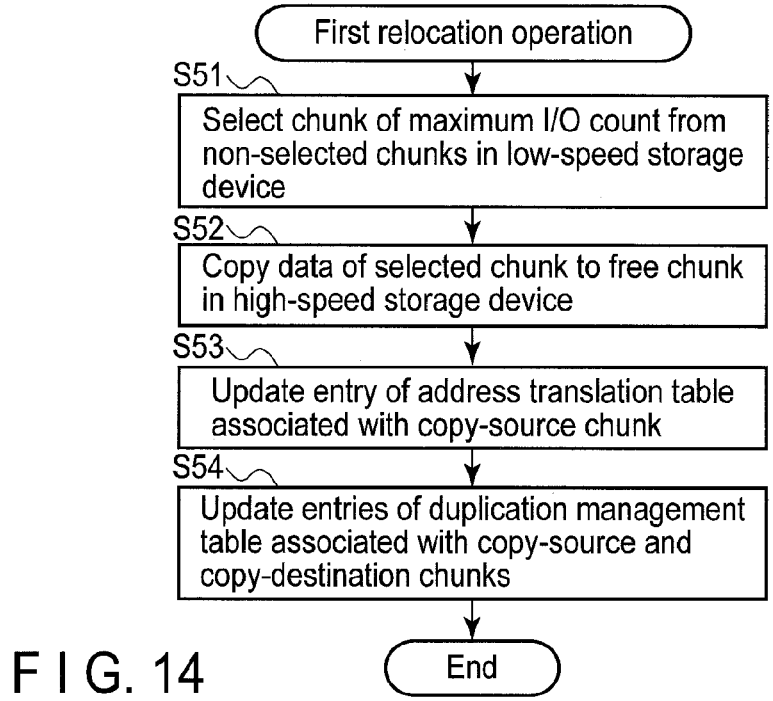
FIG. 14 is a flowchart showing an exemplary procedure of a first relocation operation included in the relocation processing shown in FIG. 13.

Referring then to FIG. 14, a description will be given of the first relocation operation (step S46) in the relocation processing shown in FIG. 13. FIG. 14 is a flowchart showing an exemplary procedure of the first relocation operation. First, the tiering controller 1365 selects a physical chunk having a maximum I/O count from a group of non-selected physical chunks in the low-speed storage device 12, based on the result of the above-mentioned sorting processing (step S41 of FIG. 13) (step S51).

Next, the tiering controller 1365 copies (relocates) data in the selected physical chunk to a free physical chunk in the high-speed storage device 11 (step S52). Assume here that the physical chunk ID of the copy-source physical chunk (namely, the selected physical chunk) is PCIDcs, and the physical chunk ID of the copy-destination physical chunk is PCIDcd. Assume also that the copy-destination physical chunk is allocated to logical chunk LCu_w. In this case, in table 1331a of the address translation table 1331, PCIDcd is set in the physical chunk ID field of an entry associated with logical chunk LCu_w (indicated by a combination of logical disk ID and an LBA).

After executing step S52, the tiering controller 1365 updates the content of an entry of the address translation table 1331 associated with the copy-source physical chunk (namely, the selected physical chunk) (step S53), as follows: First, the tiering controller 1365 determines an entry (in which PCIDcs is set) of table 1331a in the address translation table 1331, which is associated with the copy-source physical chunk. Subsequently, the tiering controller 1365 changes the content of the physical chunk ID field in the determined entry from PCIDcs to PCIDcd. As a result, the physical chunk allocated to logical chunk LCu_w is changed from the copy-source physical chunk to the copy-destination physical chunk.

Moreover, the tiering controller 1365 causes the deduplication controller 1363 to update the content of entries of the duplication management table 1332 associated with the copy-source physical chunk and the copy-destination physical chunk (step S54). That is, the deduplication controller 1363 exchanges the content of the hash value field and duplication count field in the entry of the duplication management table 1332 associated with the copy-source physical chunk, for the content (invalid value and 0) of the hash value field and duplication count field in the entry of the duplication management table 1332 associated with the copy-destination physical chunk. This is the end of the first relocation operation (step S46 of FIG. 13) performed by the tiering controller 1365. Step S54 may be executed before step S53.

Figure 15:
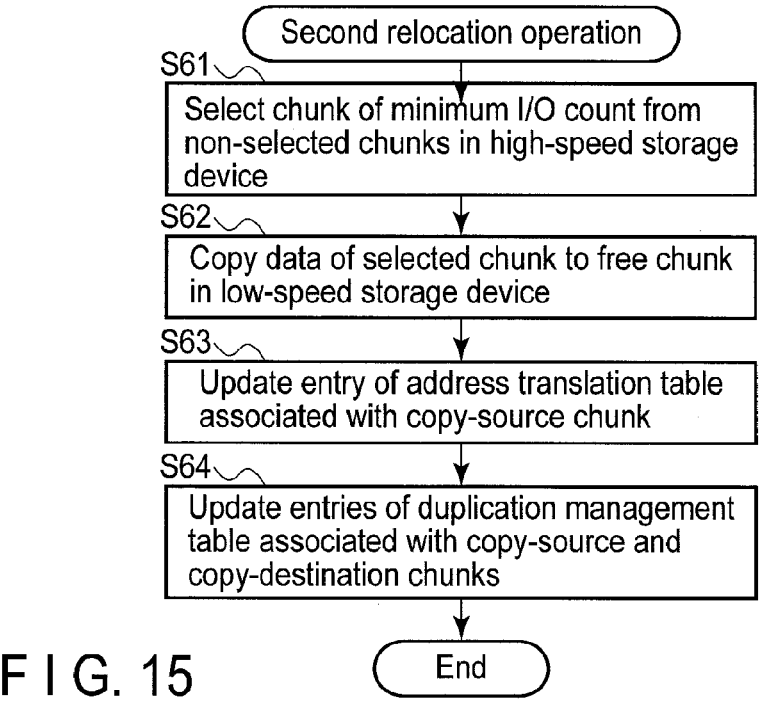
FIG. 15 is a flowchart showing an exemplary procedure of a second relocation operation included in the relocation processing shown in FIG. 13.

Referring next to FIG. 15, a description will be given of the second relocation operation (step S48) included in the relocation processing shown in FIG. 13. FIG. 15 is a flowchart showing an exemplary procedure of the second relocation operation. First, the tiering controller 1365 selects a physical chunk having a minimum I/O count from a group of non-selected physical chunks in the high-speed storage device 11, based on the result of the above-mentioned sorting processing (step S61).

Subsequently, the tiering controller 1365 copies data in the selected physical chunk to a free physical chunk in the low-speed storage device 12 (step S62). Subsequently, the tiering controller 1365 updates the content of an entry of the address translation table 1331 associated with the copy-source physical chunk, in the same way as in step S53 (FIG. 14) (step S63).

After that, the tiering controller 1365 causes the deduplication controller 1363 to update the content of entries of the duplication management table 1332 associated with the copy-source physical chunk and the copy-destination physical chunk, in the same way as in step S54 (FIG. 14) (step S64). This is the end of the second relocation operation (step S48 of FIG. 13) performed by the tiering controller 1365.

Referring then to FIG. 16, a description will be given of the third relocation operation (step S50) included in the relocation processing shown in FIG. 13. FIG. 16 is a flowchart showing an exemplary procedure of the third relocation operation. The third relocation operation includes two relocation operations equivalent to the first and second relocation operations.

First, the tiering controller 1365 performs a relocation operation (steps S71 to S74) equivalent to the first relocation operation (steps S51 to S54 of FIG. 14). If necessary, in the description related to the above-mentioned first relocation operation, steps S51 to S54 may be replaced with steps S71 to S74. Next, the tiering controller 1365 performs a relocation operation (steps S75 to S78) equivalent to the second relocation operation (steps S61 to S64 of FIG. 15). If necessary, in the description related to the above-mentioned second relocation operation, steps S61 to S64 may be replaced with steps S75 to S78.

As described above, in the embodiment, the deduplication controller 1363 excludes duplication data logical chunk by logical chunk. On the other hand, the tiering controller 1365 acquires, based on the I/O counts of logical chunks acquired by the I/O management unit 1364, the I/O counts of physical chunks each of which is allocated to one or more of the logical chunks. Further, based on the I/O count of each physical chunk (i.e., the access status of each physical chunk), the tiering controller 1365 executes data relocation between the high-speed storage device 11 and the low-speed storage device 12 (that is, between tiers) physical chunk by physical chunk. This enables the embodiment to realize data relocation reflecting the status of access to each physical chunk, with duplication data excluded logical chunk by logical chunk. As a result, in the embodiment, the performance of the logical disk can be optimized.

In addition, steps S75 to S78 may be executed before steps S71 to S74. Further, the tiering controller 1365 may execute processing of exchanging data in a physical chunk selected in step S71 with data in a physical chunk selected in step S75, immediately after, for example, step S75, in place of two copy steps (steps S72 and S76).

Moreover, the relocation operation equivalent to the above-described first relocation operation may be performed when I/O count takeover is performed in accordance with a 1 increment in the number of logical chunks allocated to a physical chunk, as is shown in FIG. 11. The example of FIG. 11 supposes a case where data of the same content as data A stored in physical chunk PCa is virtually written to logical chunk LCc. In this case, for deduplication, a new write of data having the same content as data A to a physical chunk is prevented, and physical chunk PCa is also allocated to logical chunk LCc. In the example of FIG. 11, by this allocation, the number of logical chunks, to which physical chunk PCa is allocated, increases from 2 to 3. As a result, the IOCNT of physical chunk PCa also increases from 4 to 8. Assume here that physical chunk PCa is a physical chunk in the low-speed storage device 12. In this case, the tiering controller 1365 selects a minimum I/O count (=IOCNTmin) from the I/O counts of the physical chunks in the high-speed storage device 11, which are obtained when latest relocation processing has finished. If the IOCNT of physical chunk PCa exceeds IOCNTmin, the tiering controller 1365 determines that the frequency of access to physical chunk PCa has increased. At this time, the tiering controller 1365 relocates the data of physical chunk PCa to a free physical chunk in the high-speed storage device 11, as in the first relocation operation.

Similarly, the relocation operation equivalent to the above-described second relocation operation may be performed when I/O count takeover to a new chunk (physical chunk) is performed in accordance with allocation of the new chunk to a particular logical chunk, as is shown in FIG. 10. In the example of FIG. 10, as a result of newly allocating physical chunk Pcb to logical chunk LCc, the number of logical chunks, to which physical chunk PCa is allocated, decreases from 3 to 2. Accordingly, the IOCNT of physical chunk PCa also decreases from 6 to 4. Assume here that physical chunk PCa is stored in the high-speed storage device 11. In this case, the tiering controller 1365 selects a maximum I/O count (=IOCNTmax) from the I/O counts of the physical chunks in the low-speed storage device 12, which are obtained when latest relocation processing has finished. If the IOCNT of physical chunk PCa is less than IOCNTmax, the tiering controller 1365 determines that the frequency of access to physical chunk PCa has decreased. At this time, the tiering controller 1365 relocates the data of physical chunk PCa to a free physical chunk in the low-speed storage device 12, as in the second relocation operation.

First Modification

Figure 17:
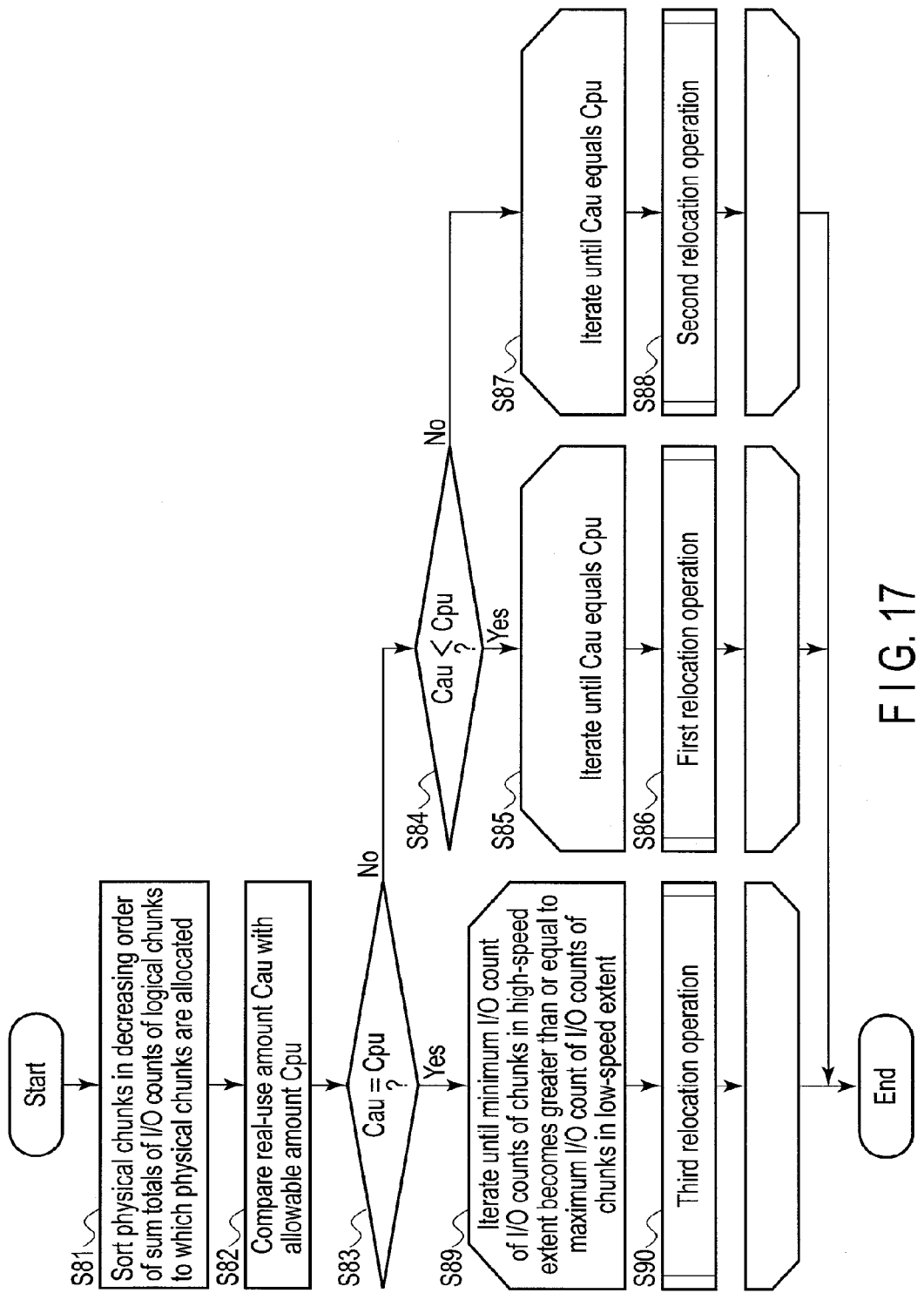
FIG. 17 is a flowchart showing an exemplary procedure of relocation processing according to a first modification of the embodiment.

A first modification of the embodiment will now be described. The first modification is characterized in that relocation processing performed based on an extent is employed. Referring to FIG. 17, the relocation processing of the first the modification will be described. FIG. 17 is a flowchart showing an exemplary procedure of the relocation processing according to the first modification. In the description below, a physical extent in the high-speed storage device 11 will be referred to as a high-speed extent, and a physical extent in the low-speed storage device 12 will be referred to as a low-speed extent.

Assume here that the time when relocation processing should be performed has been reached. At this time, the tiering controller 1365 performs relocation processing as described below. First, the tiering controller 1365 executes steps S81 to S83 that are equivalent to steps S41 to S43 (FIG. 13) in the relocation processing according to the embodiment. If necessary, in the above description associated with the relocation processing according to the embodiment, steps S41 to S43 may be replaced with steps S81 to S83.

The tiering controller 1365 determines in step S83 whether the real-use amount Cau is equal to the allowable amount Cpu. If the real-use amount Cau is not equal to the allowable amount Cpu (No in step S83), the tiering controller 1365 determines whether the amount Cau is less than the amount Cpu (step S84).

If the real-use amount Cau is less than the allowable amount Cpu (Yes in step S84), the tiering controller 1365 repeats a first relocation operation (step S86) until the above-described first condition is satisfied (step S85). The first relocation operation (step S86) differs from the first relocation operation (step S46 in FIG. 13) of the embodiment in that the former is performed based on an extent, as will be described later.

In contrast, if the real-use amount Cau is not less than the allowable amount Cpu (No in step S84), the tiering controller 1365 repeats the above-described second relocation operation (step S88) until a second condition is satisfied (step S87). The second relocation operation (step S88) differs from the second relocation operation (step S48 in FIG. 13) of the embodiment in that the former is performed based on an extent, as will be described later.

If the real-use amount Cau is equal to the allowable amount Cpu (Yes in step S83), the tiering controller 1365 repeats a third relocation operation (step S90) until the above-described third condition is satisfied (step S89). The third relocation operation (step S90) differs from the third relocation operation (step S50 in FIG. 13) of the embodiment in that the former is performed based on an extent, as will be described later.

Figure 18:
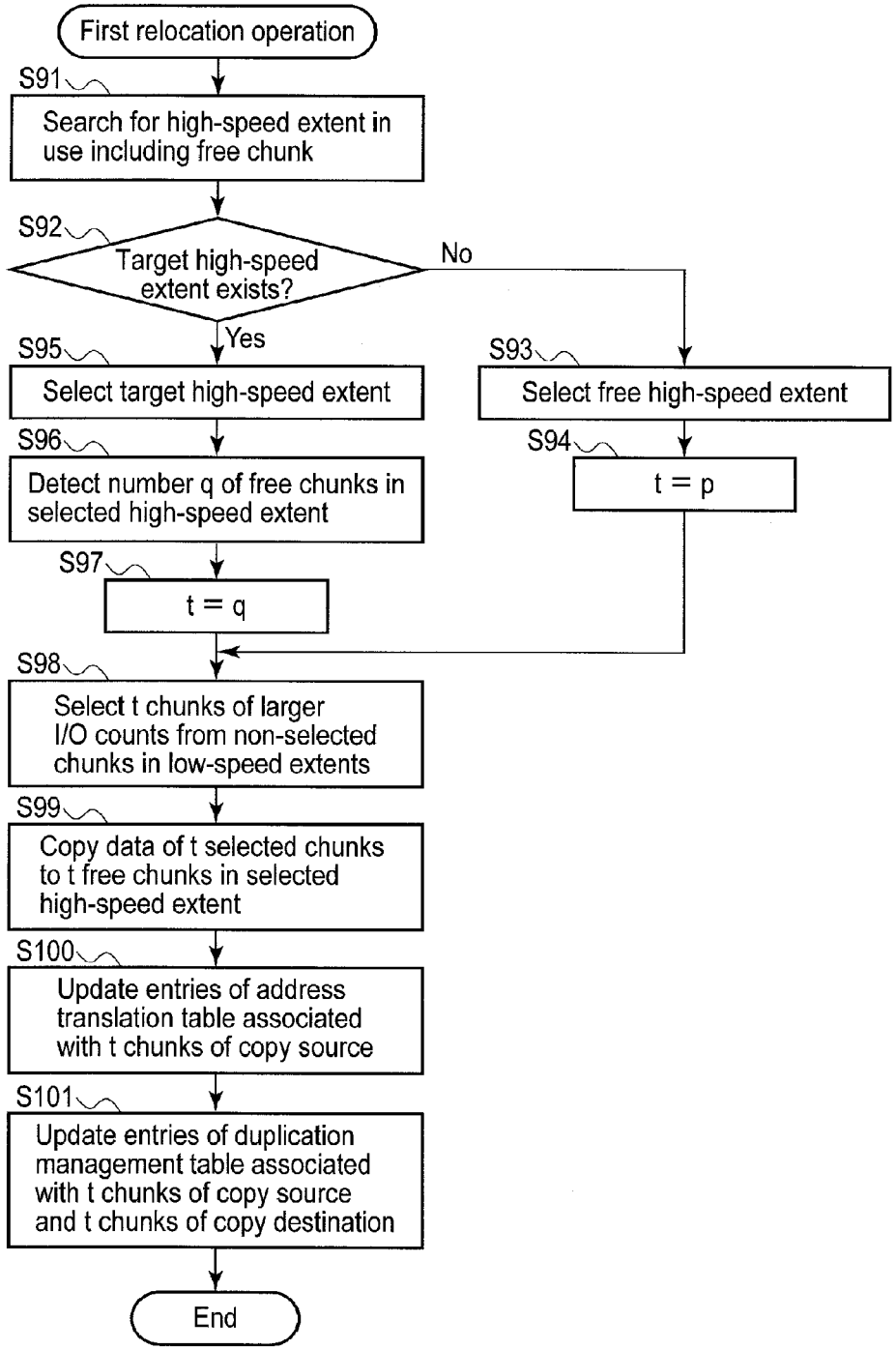
FIG. 18 is a flowchart showing an exemplary procedure of a first relocation operation in the first modification of the embodiment.

Referring then to FIG. 18, the first relocation operation (step S86) in the relocation processing shown in FIG. 17 will be described. FIG. 18 is a flowchart showing an exemplary procedure of the first relocation operation according to the first modification. First, the tiering controller 1365 searches for a high-speed extent in use, which includes at least one free chunk, as described below (step S91).

In the first modification, the physical chunk ID of a free chunk is indicated in a physical chunk field in an entry of the duplication management table 1332 including a hash value field where an invalid value ("-") is set. The physical chunk ID of a free chunk may be indicated by a free chunk list. Assume here that the free chunk is PCfc and the physical chunk ID of free chunk PCfc is PCIDfc. Assume also that the extent ID of a physical extent including free chunk PCfc is PEIDfc. In this case, the tiering controller 1365 acquires physical chunk IDs set in physical chunk fields in all entries of table 1331b of the address translation table 1331, which include SID0 and PEIDfc.

The tiering controller 1365 searches the duplication management table 1332, based on the acquired physical chunk IDs, for an entry including a valid hash value, with which at least one of the acquired physical chunks ID is associated. If the tiering controller 1365 has detected such an entry, it determines that the physical extent represented by PEIDfc is a high-speed extent in use including a free chunk.

The storage controller 13 may include an extent management table for managing the state of each physical extent in the high-speed storage device 11 and the low-speed storage device 12. Assume here that the extent management table includes entries associated with the respective physical extents, flags indicating whether the respective physical extents are in use or free, and at least one of a list of physical chunks in use in the respective physical extents and a list of free physical chunks in the respective physical extents. In this case, the tiering controller 1365 can easily detect a high-speed extent (or low-speed extent) in use that includes a free chunk, based on the management table. The tiering controller 1365 can also detect a free high-speed extent (or low-speed extent), based on the management table.

After executing step S91, the tiering controller 1365 determines whether a target high-speed extent (namely, a high-speed extent in use that includes a free chunk) has been detected (step S92). If the target high-speed extent has not been detected (No in step S92), the tiering controller 1365 selects a free high-speed extent (step S93). Subsequently, the tiering controller 1365 sets the number p of physical chunks in a physical extent to a variable t (step S94). After that, the tiering controller 1365 proceeds to step S98.

In contrast, if the target high-speed extent has been detected (Yes in step S92), the tiering controller 1365 selects the target high-speed extent (step S95). Next, the tiering controller 1365 detects the number q of free chunks in the selected high-speed extent (step S96), and sets the detected number q to the variable t (step S97). After that, the tiering controller 1365 proceeds to step S98. As is evident, q is not less than 1 and less than p.

In step S98, the tiering controller 1365 selects t chunks, which have larger I/O counts, from non-selected chunks in the low-speed storage device 12 (i.e., in a group of low-speed extents). Next, the tiering controller 1365 copies (relocates) data in the t selected chunks to t free chunks in the selected high-speed extent (step S99). If the t chunks of the copy destination are free chunks in the high-speed extent in use selected in step S95, the partial free state (so-called worm-eaten spot state) of the high-speed extent in use is canceled by the copy operation in step S99.

Next, the tiering controller 1365 updates the content of entries of the address translation table 1331 associated with the t chunks of the copy source (step S100). That is, the tiering controller 1365 changes, to the physical chunk IDs of the t chunks of the copy destination, the content of the physical chunk ID fields in the t entries of the address translation table 1331 associated with the t chunks of the copy source.

Moreover, the tiering controller 1365 causes the deduplication controller 1363 to update the content of entries of the duplication management table 1332 associated with the t chunks of the copy source and the t chunks of the copy destination (step S101). That is, the deduplication controller 1363 exchanges the content of the hash value fields and the duplication count fields in the entries of the duplication management table 1332 associated with the t chunks of the copy source, for the content (the invalid value and 0) of the hash value fields and the duplication count fields in the entries of the duplication management table 1332 associated with the t chunks of the copy destination. This is the termination of the first relocation operation (step S86 of FIG. 17) by the tiering controller 1365. Step S101 may be executed before step S100.

Figure 19:
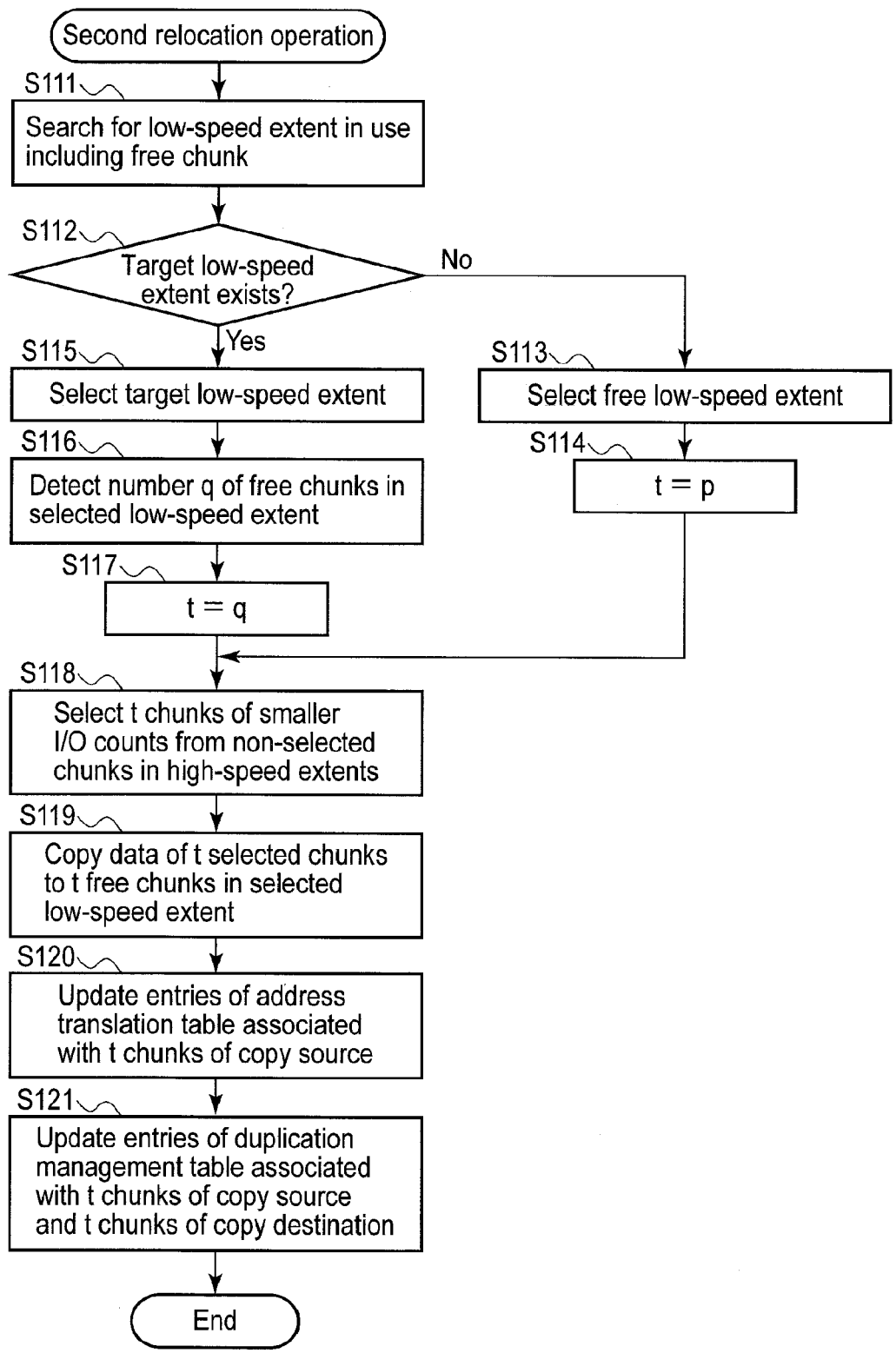
FIG. 19 is a flowchart showing an exemplary procedure of a second relocation operation in the first modification.

Referring next to FIG. 19, the second relocation operation (step S88) in the relocation processing shown in FIG. 17 will be described. FIG. 19 is a flowchart showing an exemplary procedure of the second relocation operation in the first modification. First, the tiering controller 1365 searches for a low-speed extent in use that includes at least one free chunk (step S111). Assume here that the free chunk is PCfd and the physical chunk ID of free chunk PCfd is PCIDfd. Assume also that the extent ID of a physical extent that includes free chunk PCfd is PEIDfd. In this case, the tiering controller 1365 acquires physical chunk IDs set in physical chunk fields in all entries of table 1331b of the address translation table 1331, which include SID1 and PEIDfd.

The tiering controller 1365 searches the duplication management table 1332, based on the acquired physical chunk IDs, for an entry including a valid hash value, with which at least one of the acquired physical chunks IDs is associated. If the tiering controller 1365 could detect such an entry, it determines that the physical extent represented by PEIDfd is a low-speed extent in use that includes a free chunk.

After executing step S111, the tiering controller 1365 determines whether a target low-speed extent (namely, a low-speed extent in use that includes a free chunk) has been detected (step S112). If the target low-speed extent has not been detected (No in step S112), the tiering controller 1365 selects a free low-speed extent (step S113). Subsequently, the tiering controller 1365 sets the number p of physical chunks in a physical extent to a variable t, as in step S93 (FIG. 18) (step S114). After that, the tiering controller 1365 proceeds to step S118.

In contrast, if the target low-speed extent has been detected (Yes in step S112), the tiering controller 1365 selects the target low-speed extent (step S115). Next, the tiering controller 1365 detects the number q of free chunks in the selected low-speed extent (step S116), and sets the detected number q to the variable t, as in step S97 (FIG. 18) (step S117). After that, the tiering controller 1365 proceeds to step S118.

In step S118, the tiering controller 1365 selects t chunks, which have smaller I/O counts, from non-selected chunks in the high-speed storage device 11 (i.e., in a group of high-speed extents). Next, the tiering controller 1365 copies (relocates) data in the t selected chunks to t free chunks in the selected low-speed extent (step S119). If the t chunks of the copy destination are free chunks in the low-speed extent in use selected in step S115, the partial free state of the low-speed extent in use is canceled by the copy operation in step S119.

Next, the tiering controller 1365 updates the content of entries of the address translation table 1331 associated with the t chunks of the copy source, as in above-mentioned step S100 (FIG. 18) (step S120). Moreover, the tiering controller 1365 causes the deduplication controller 1363 to update the content of entries of the duplication management table 1332 associated with the t chunks of the copy source and the t chunks of the copy destination, as in above-mentioned step S101 (FIG. 18) (step S121). This is the termination of the second relocation operation (step S88 of FIG. 17) by the tiering controller 1365. Step S121 may be executed before step S120.

Figure 20:
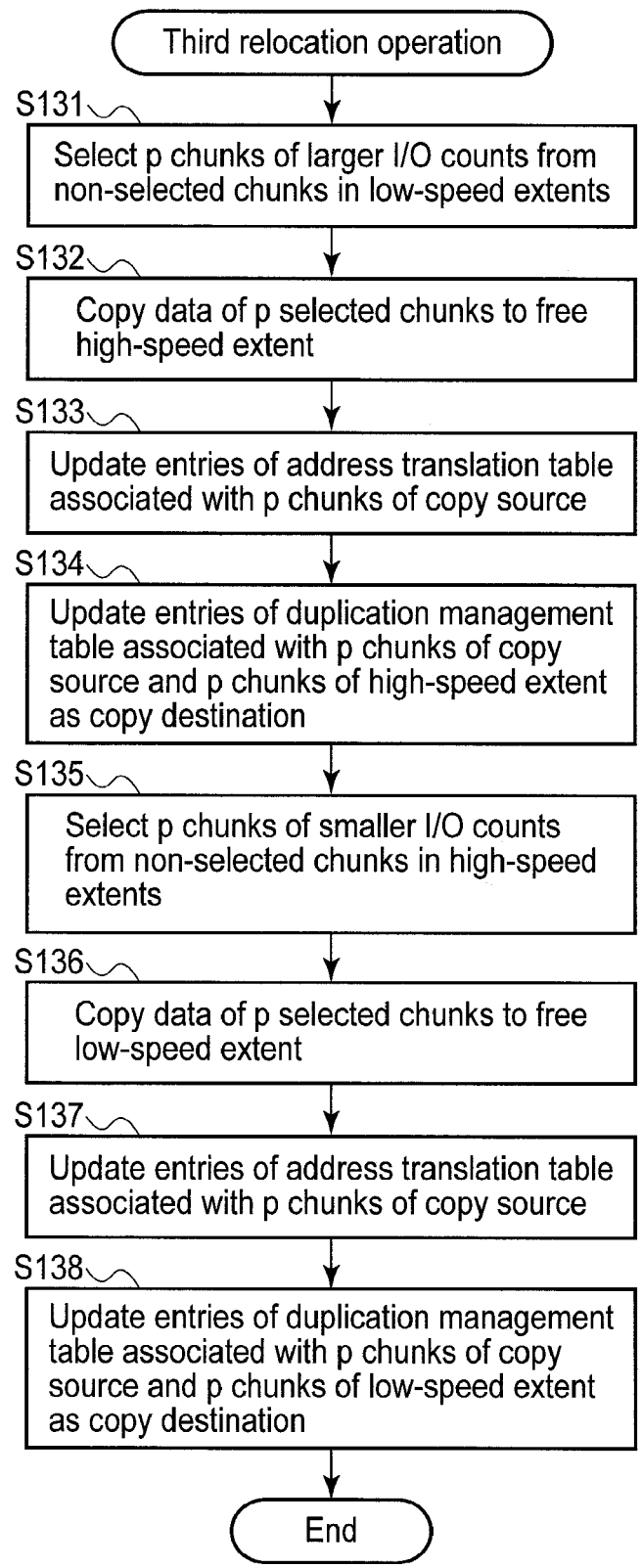
FIG. 20 is a flowchart showing an exemplary procedure of a third relocation operation in the first modification.

Referring next to FIG. 20, the third relocation operation (step S90) in the relocation processing shown in FIG. 17 will be described. FIG. 20 is a flowchart showing an exemplary procedure of the third relocation operation in the first modification. First, the tiering controller 1365 searches for p chunks having larger I/O counts (i.e., several chunks constituting a single physical extent) from a group of non-selected chunks included in a group of low-speed extents (step S131). After that, the tiering controller 1365 copies (relocates) data in the p selected chunks to p chunks in a free high-speed extent (step S132).

Next, the tiering controller 1365 updates the content of entries of the address translation table 1331 associated with the p chunks of the copy source (step S133). That is, the tiering controller 1365 changes, to the physical chunk IDs of the p chunks of the high-speed extent as the copy destination, the content of the physical chunk ID fields in the p entries of the address translation table 1331 associated with the p chunks of the copy source.

Moreover, the tiering controller 1365 causes the deduplication controller 1363 to update the content of entries of the duplication management table 1332 associated with the p chunks of the copy source and the p chunks of the high-speed extent as the copy destination (step S134). That is, the deduplication controller 1363 exchanges the content of the hash value fields and the duplication count fields in the entries of the duplication management table 1332 associated with the p chunks of the copy source, for the content (the invalid value and 0) of the hash value fields and the duplication count fields in the entries of the duplication management table 1332 associated with the p chunks of the copy destination.

Steps S131 to S134 are equivalent to the processing included in the first relocation operation shown in FIG. 18 and executed when the answer in step S92 is No. Step S134 may be executed before step S133.

Subsequently, the tiering controller 1365 selects p chunks, which have smaller I/O counts, from a group of non-selected chunks in a group of high-speed extents (step S135). After that, the tiering controller 1365 copies (relocates) data in the p selected chunks to p free chunks in a free low-speed extent (step S136).

Next, the tiering controller 1365 updates the content of entries of the address translation table 1331 associated with the p chunks of the copy source (step S137). That is, the tiering controller 1365 changes, to the physical chunk IDs of the p chunks of the low-speed extent as the copy destination, the content of the physical chunk ID fields in the p entries of the address translation table 1331 associated with the p chunks of the copy source.

Moreover, the tiering controller 1365 causes the deduplication controller 1363 to update the content of entries of the duplication management table 1332 associated with the p chunks of the copy source and the p chunks of the low-speed extent as the copy destination (step S138). That is, the deduplication controller 1363 exchanges the content of the hash value fields and the duplication count fields in the entries of the duplication management table 1332 associated with the p chunks of the copy source, for the content (the invalid value and 0) of the hash value fields and the duplication count fields in the entries of the duplication management table 1332 associated with the p chunks of the copy destination. This is the termination of the third relocation operation (step S90 of FIG. 17) by the tiering controller 1365.

Steps S135 to S138 are equivalent to the processing included in the second relocation operation shown in FIG. 19 and executed when the answer in step S112 is No. Step S138 may be executed before step S137. Further, steps S135 to S138 may be executed before steps S131 to S134.

Figure 21:
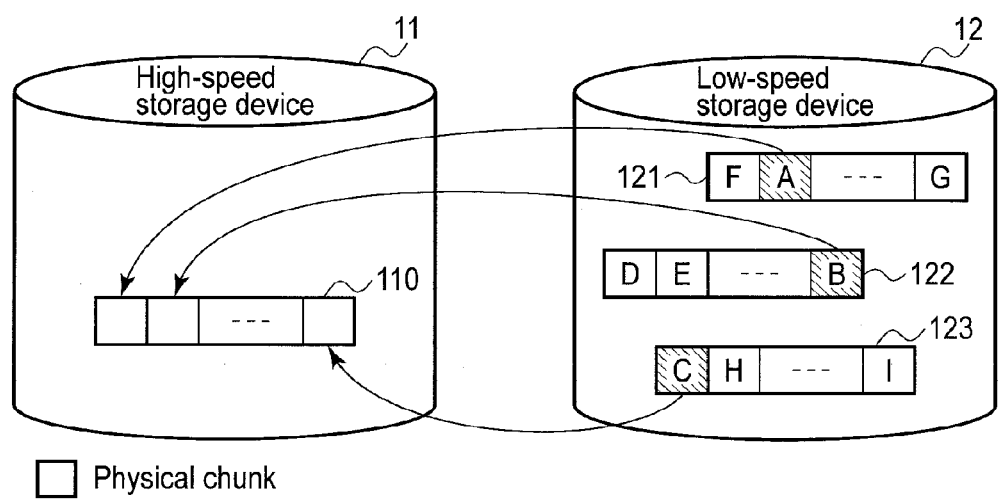
FIG. 21 is a view showing a first example of relocation in the first modification.

Referring now to FIGS. 21 to 24, a description will be given of relocation examples in the first modification. FIG. 21 shows a first example of the relocation. The first example is directed to an example of relocation (step S99) executed when the answer in step S92 is No, or an example of relocation (step S132) in the third relocation operation shown in FIG. 20. In FIG. 21, the high-speed storage device 11 includes a free physical (high speed) extent 110, and the low-speed storage device 12 includes physical (low speed) extents 121, 122 and 123 in use.

Low-speed extents 121, 122 and 123 include physical chunks storing data items A, B and C, respectively. Assume here that three physical chunks storing data items A, B and C, respectively, are included in the p (t=p) physical chunks selected in step S98 (FIG. 18) or step S131 (FIG. 20). In the example of FIG. 21, data (i.e., p data items including data items A, B and C) in the p physical chunks selected in step S98 or S131 is relocated to the free high-speed extent 110 in the high-speed storage device 11.

Figure 22:
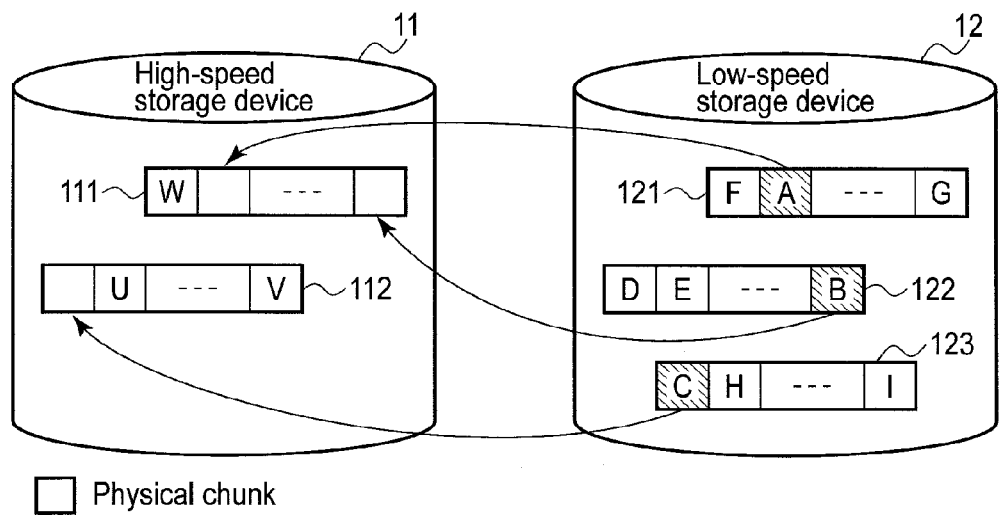
FIG. 22 is a view showing a second example of relocation in the first modification.

FIG. 22 shows a second example of the relocation in the first modification. The second example is directed to an example of relocation (step S99) executed in the first relocation operation of FIG. 18 when the answer in step S92 is Yes. In FIG. 22, the high-speed storage device 11 includes high-speed extents 111 and 112 in use, while the low-speed storage device 12 includes low-speed extents 121, 122 and 123 in use, as in the example of FIG. 21. Assume that high-speed extents 111 and 112 include q1 free physical chunks and q2 free physical chunks, respectively.

As described above, low-speed extents 121, 122 and 123 include physical chunks that store data items A and B and C, respectively. Assume that two physical chunks storing data items A and B, respectively, are included in q1 (t=q=q1) physical chunks selected in step S98 of a first iteration (FIG. 18), and that a physical chunk storing data item C is included in q2 (t=q=q2) physical chunks selected in step S98 of a second iteration. In the example of FIG. 22, q1 physical chunk data items (i.e., q1 data items including data items A and B) selected in step S98 of the first iteration are relocated to q1 free physical chunks included in high-speed extent 111 in the high-speed storage device 11. Similarly, q2 physical chunk data items (i.e., q2 data items including data item C) selected in step S98 of the second iteration are relocated to q2 free physical chunks included in high-speed extent 112 in the high-speed storage device 11.

FIG. 23 shows a third example of the relocation in the first modification. The third example is directed to an example of relocation (step S119) executed in the second relocation operation shown in FIG. 19 when the answer in step S112 is No, or an example of relocation (step S136) executed in the third relocation operation shown in FIG. 20. In FIG. 23, the high-speed storage device 11 includes high-speed extents 113, 114 and 115 in use, and the low-speed storage device 12 includes a free low-speed extent 120.

High-speed extents 113, 114 and 115 include physical chunks storing data items R, S and T, respectively. Assume that three physical chunks storing data items R, S and T, respectively, are included in the p (t=p) physical chunks selected in step S118 (FIG. 19) or step S135 (FIG. 20). In the example of FIG. 23, data items, (i.e., p data items storing data items R, S and T) in the p physical chunks selected in step S118 or S135 are relocated to the free low-speed extent 120 in the low-speed storage device 12.

FIG. 24 shows a fourth example of the relocation in the first modification. The fourth example is directed to an example of relocation (step S119) executed in the second relocation operation shown in FIG. 19 when the answer in step S112 is Yes. In FIG. 24, the high-speed storage device 11 includes high-speed extents 113, 114 and 115 in use, as in the example of FIG. 23, and the low-speed storage device 12 includes low-speed extents 124 and 125 in use. Assume that low-speed extents 124 and 125 include q3 and q4 free physical chunks, respectively.

As described above, high-speed extents 113, 114 and 115 include physical chunks storing data items R, S and T, respectively. Assume that a physical chunk storing data item R, is included in q3 (t=q=q3) physical chunks selected in step S118 of a first iteration (FIG. 19), and that two physical chunks storing data item S and T are included in q4 (t=q=q4) physical chunks selected in step S118 of a second iteration. In the example of FIG. 24, q3 physical-chunk data items (i.e., q3 data items including data item R) selected in step S118 of the first iteration are relocated to q3 free physical chunks included in low-speed extent 124 in the low-speed storage device 12. Similarly, q4 physical chunk data items (i.e., q4 data items including data items S and T) selected in step S118 of the second iteration are relocated to q4 free physical chunks included in low-speed extent 125 in the low-speed storage device 12.

Second Modification

A second modification of the embodiment will be described. In the relocation processing of the first modification, a copy source is selected physical chunk by physical chunk. Accordingly, in the first modification, whenever relocation processing is performed, fragmentation occurs in physical extents including the physical chunks of the copy source, and hence defragmentation processing is needed at some stage. In view of this, the second modification is characterized in that in order to reduce fragmentation of physical extents (in particular, low-speed extents), a copy source is selected physical extent by physical extent when data is relocated from the low-speed storage device 12 to the high-speed storage device 11. Therefore, in the second modification, the sum total (or average), for example, of the I/O counts of all physical chunks in a physical extent is used as the I/O count of the physical extent.

Hereafter, the second modification will be described by focusing on a point different from the first modification. In the second modification, for example, the tiering controller 1365 selects, as a copy source, a low-speed extent of a maximum I/O count from a group of non-selected low-speed extents during processing equivalent to step S131 (FIG. 20) in the third relocation operation of the first modification. Further, the tiering controller 1365 selects, as copy destinations, a plurality of high-speed extents in use from a group of high-speed extents, in order to secure the copy (relocation) destinations of data stored in p physical chunks in the selected low-speed extent. Each of the plurality of high-speed extents in use includes at least one free physical chunk, and the sum total of free physical chunks included in the plurality of high-speed extents in use is p or more. After that, the tiering controller 1365 relocates the data of the p physical chunks in the selected low-speed extent to p free physical chunks in the plurality of selected high-speed extents.

FIG. 25 shows an example of the above-mentioned relocation in the second modification. In FIG. 25, the high-speed storage device 11 includes high-speed extents 116, 117 and 118 in use. Each of high-speed extents 116, 117 and 118 includes at least one free physical chunk, and the sum total of the free physical chunks included in high-speed extents 116, 117 and 118 is p or more. The low-speed storage device 12 includes low-speed extent 126 in use. The p physical chunks in low-speed extent 126 are currently used, and store p data items including data items A, B and C.

In FIG. 25, it is assumed that low-speed extent 126 is selected as a copy source, and high-speed extents 116, 117 and 118 are selected as copy destinations. In this case, the tiering controller 1365 copies (relocates), to p free physical chunks in high-speed extent 116, 117 and 118, p data items stored in the p physical chunks of low-speed extent 126 and including data items A, B and C. Thus, low-speed extent 126 can be used as a free extent.

As described above, in the second modification, the relocation operation prevents occurrence of fragmentation in a low-speed extent (including physical chunks) as a copy source. Moreover, the relocation operation reduces fragmentation in a plurality of high-speed extents (including physical chunks) as copy destinations. In particular, when the sum total of free physical chunks included in a plurality of high-speed extents as copy destinations coincides with p, fragmentation in the plurality of high-speed extents can be avoided. The above-described relocation operation of the second modification may be performed in place of the first relocation operation of the first modification.

Third Modification

A third modification of the embodiment will be described. The third modification is characterized in that in order to reduce fragmentation in physical extents (in particular, high-speed extents) that may well occur in the first modification, a copy source is selected physical-extent by physical-extent when data is relocated from the high-speed storage device 11 to the low-speed storage device 12 in a way opposite to the second modification.

Hereafter, the third modification will be described by focusing on a point different from the first and second modifications. In the third modification, the tiering controller 1365 selects, as a copy source, a high-speed extent of a minimum I/O count from a group of non-selected high-speed extents during, for example, processing equivalent to step S135 (FIG. 20) in the third relocation operation of the first modification. Further, the tiering controller 1365 selects, as copy destinations, a plurality of low-speed extents in use from a group of low-speed extents, in order to secure the copy (relocation) destinations of data stored in p physical chunks in the selected high-speed extent. Each of the plurality of low-speed extents in use includes at least one free physical chunk, and the sum total of free physical chunks included in the plurality of the low-speed extents in use is p or more. After that, the tiering controller 1365 relocates the data of the p physical chunks in the selected high-speed extent to p free physical chunks in the plurality of selected low-speed extents.

FIG. 26 shows an example of the above-described relocation in the third modification. In FIG. 26, the high-speed storage device 11 includes high-speed extent 119 in use. P physical chunks in high-speed extent 119 are in use, and store p data items including data items R, S and T. The low-speed storage device 12 includes low-speed extents 127 and 128 in use. Each of low-speed extents 127 and 128 includes at least one free physical chunk, and the sum total of free physical chunks included in low-speed extents 127 and 128 is p or more.

In FIG. 26, it is assumed that high-speed extent 119 is selected as a copy source, and low-speed extents 127 and 128 are selected as copy destinations. In this case, the tiering controller 1365 copies (relocates), to p free physical chunks in low-speed extent 127 and 128, p data items stored in the p physical chunks of high-speed extent 119 and including data items R, S and T. Thus, high-speed extent 119 can be used as a free extent.

As described above, in the third modification, the relocation operation prevents occurrence of fragmentation in a high-speed extent (including physical chunks) as a copy source. Moreover, the relocation operation reduces fragmentation in a plurality of low-speed extents (including physical chunks) as copy destinations. In particular, when the sum total of free physical chunks included in a plurality of low-speed extents as copy destinations coincides with p, fragmentation in the plurality of low-speed extents can be avoided. The above-described relocation operation of the third modification may be performed in place of the second relocation operation of the first modification.

In at least one of the embodiments (modifications), the performance of the logical disk can be optimized by relocating data that reflects a state of access to physical chunks, with data duplication excluded logical chunk by logical chunk.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tiered storage system comprising:
a first storage device which includes a storage area comprising a plurality of physical chunks;
a second storage device which includes a storage area comprising a plurality of physical chunks and has a lower access speed than the first storage device; and
a storage controller which controls access to the first and second storage devices,
wherein
the storage controller comprises a configuration management unit, an input/output controller, a deduplication controller, an input/output management unit and a tiering controller;
the configuration management unit constructs a logical disk including a virtual storage area which comprises a plurality of logical chunks, based on the storage area of each of the first and second storage devices, and provides the logical disk to a host computer utilizing the tiered storage system;
the input/output controller reads data from the first or second storage device or writes data to the first or second storage device, in accordance with an access request from the host computer;
when first data is virtually written to a first logical chunk in accordance with the access request, the deduplication controller determines whether second data of same content as the first data is stored in at least one of the first and second storage devices;
in a first case where the second data is stored in a first physical chunk which is allocated at least to a second logical chunk and is in one of the first and second storage devices, the deduplication controller also allocates the first physical chunk to the first logical chunk and prevents actual writing of the first data for deduplication, and
in a second case where the second data is stored in neither of the first and second storage devices, the deduplication controller allocates, to the first logical chunk, a second physical chunk which is free and is in one of the first and second storage devices, and causes the input/output controller to write the first data to the second physical chunk;
the input/output management unit acquires input/output statistics indicating states of access to the plurality of logical chunks;
the tiering controller acquires, based on the input/output statistics of the plurality of logical chunks, input/output statistics of physical chunks, each of which is allocated to one or more of the plurality of logical chunks, and executes at least one of a first relocation operation and a second relocation based on the input/output statistics of the physical chunks;
the first relocation operation includes relocating, to a fourth physical chunk in the first storage device, data in a third physical chunk in the second storage device, the third physical chunk being allocated to a third logical chunk; and
the second relocation operation includes relocating, to a sixth physical chunk in the second storage device, data in a fifth physical chunk in the first storage device, the fifth physical chunk being allocated to a fourth logical chunk.

2. The tiered storage system of claim 1, wherein:
when the third physical chunk is allocated to two or more logical chunks including the third logical chunk, the tiering controller acquires a sum total of input/output statistics of the two or more logical chunks as an input/output statistic of the third physical chunk; and
when the first relocation operation is executed, the tiering controller takes over the sum total of the input/output statistics of the two or more logical chunks as an input/output statistic of the fourth physical chunk.

3. The tiered storage system of claim 1, wherein:
when the first data is virtually written to the first logical chunk, the input/output management unit increments an input/output statistic of the first logical chunk regardless of whether actual writing of the first data is prevented; and
when the first data is written to the second physical chunk, the tiering controller takes over the input/output statistic of the first logical chunk as an input/output statistic of the second physical chunk.

4. The tiered storage system of claim 1, wherein when third data different from the first data is stored in a seventh physical chunk allocated to the first logical chunk, and actual writing of the first data is prevented, the tiering controller takes over, as an input/output statistic of the first physical chunk, a sum total of input/output statistics of all logical chunks which include the first and second logical chunks and to which the first physical chunk is allocated, and cancels allocation of the seventh physical chunk to the first logical chunk.

5. The tiered storage system of claim 1, wherein:
the first relocation operation further includes selecting a physical chunk of a maximum input/output statistic as the third physical chunk from non-selected physical chunks in the second storage device; and
the second relocation operation further includes selecting a physical chunk of a minimum input/output statistic as the fifth physical chunk from non-selected physical chunks in the first storage device.

6. The tiered storage system of claim 5, wherein the tiering controller compares a first capacity used in the first storage device with a second capacity allowed to be used, and executes the first relocation operation, the second relocation operation, or both of the first and second relocation operations, based on a result of the comparison.

7. The tiered storage system of claim 6, wherein the tiering controller executes the first relocation operation when the first capacity is less than the second capacity, executes the second relocation operation when the first capacity exceeds the second capacity, and executes both the first and second relocation operations when the first capacity is equal to the second capacity.

8. The tiered storage system of claim 1, wherein:
the storage area of each of the first and second storage devices is divided for management into a plurality of physical extents each comprising a certain number of physical chunks;
the first relocation operation further includes selecting, from non-selected physical chunks in the second storage device, physical chunks of higher input/output statistics as a first group of physical chunks including the third physical chunk, and relocating data of the selected first group to a first physical extent which includes the fourth physical chunk and is in the first storage device; and
the second relocation operation further includes selecting, from non-selected physical chunks in the first storage device, physical chunks of lower input/output statistics as a second group of physical chunks including the fifth physical chunk, and relocating data of the selected second group to a second physical extent which includes the sixth physical chunk and is in the second storage device.

9. The tiered storage system of claim 8, wherein the tiering controller compares a first capacity used in the first storage device with a second capacity allowed to be used, and executes the first relocation operation, the second relocation operation, or both of the first and second relocation operations, based on a result of the comparison.

10. The tiered storage system of claim 9, wherein the tiering controller executes the first relocation operation when the first capacity is less than the second capacity, executes the second relocation operation when the first capacity exceeds the second capacity, and executes both the first and second relocation operations when the first capacity is equal to the second capacity.

11. The tiered storage system of claim 10, wherein:
the fourth physical chunk is a free physical chunk; and
the first relocation operation further includes selecting, as the first physical extent, a physical extent in use which includes a group of free physical chunks.

12. The tiered storage system of claim 11, wherein the first relocation operation further includes selecting a free physical extent as the first physical extent when the first storage device does not store the physical extent in use which includes the group of free physical chunks.

13. The tiered storage system of claim 10, wherein:
the sixth physical chunk is a free physical chunk; and
the second relocation operation further includes selecting, as the second physical extent, a physical extent in use which includes a group of free physical chunks.

14. The tiered storage system of claim 13, wherein the second relocation operation further includes selecting a free physical extent as the second physical extent when the second storage device does not include the physical extent in use which includes the group of free physical chunks.

15. A storage controller controlling a first storage device and a second storage device, the first storage device including a storage area which comprises a plurality of physical chunks, the second storage device including a storage area which comprises a plurality of physical chunks, the second storage device being lower in access speed than the first storage device, the storage controller comprising:
a configuration management unit;
an input/output controller;
a deduplication controller;
an input/output management unit; and
a tiering controller,
wherein
the configuration management unit constructs a logical disk including a virtual storage area which comprises a plurality of logical chunks, based on the storage area of each of the first and second storage devices, and provides the logical disk to a host computer utilizing a tiered storage system which comprises the first and second storage devices and the storage controller;
the input/output controller reads data from the first or second storage device or writes data to the first or second storage device, in accordance with an access request from the host computer;
when first data is virtually written to a first logical chunk in accordance with the access request, the deduplication controller determines whether second data of same content as the first data is stored in at least one of the first and second storage devices;
in a first case where the second data is stored in a first physical chunk which is allocated at least to a second logical chunk and is in one of the first and second storage devices, the deduplication controller also allocates the first physical chunk to the first logical chunk and prevents actual writing of the first data for deduplication, and
in a second case where the second data is stored in neither of the first and second storage devices, the deduplication controller allocates, to the first logical chunk, a second physical chunk which is free and is in one of the first and second storage devices, and causes the input/output controller to write the first data to the second physical chunk;
the input/output management unit acquires input/output statistics indicating states of access to the plurality of logical chunks;

the tiering controller acquires, based on the input/output statistics of the plurality of logical chunks, input/output statistics of physical chunks, each of which is allocated to one or more of the plurality of logical chunks, and executes at least one of a first relocation operation and a second relocation based on the input/output statistics of the physical chunks;

the first relocation operation includes relocating, to a fourth physical chunk in the first storage device, data in a third physical chunk in the second storage device, the third physical chunk being allocated to a third logical chunk; and the second relocation operation includes relocating, to a sixth physical chunk in the second storage device, data in a fifth physical chunk in the first storage device, the fifth physical chunk being allocated to a fourth logical chunk.

16. The storage controller of claim 15, wherein:

when the third physical chunk is allocated to two or more logical chunks including the third logical chunk, the tiering controller acquires a sum total of input/output statistics of the two or more logical chunks as an input/output statistic of the third physical chunk; and when the first relocation operation is executed, the tiering controller takes over the sum total of the input/output statistics of the two or more logical chunks as an input/output statistic of the fourth physical chunk.

17. The storage controller of claim 15, wherein:

the storage area of each of the first and second storage devices is divided for management into a plurality of physical extents each comprising a certain number of physical chunks;

the first relocation operation further includes selecting, from non-selected physical chunks in the second storage device, physical chunks of higher input/output statistics as a first group of physical chunks including the third physical chunk, and relocating data of the selected first group to a first physical extent which includes the fourth physical chunk and is in the first storage device; and the second relocation operation further includes selecting, from non-selected physical chunks in the first storage device, physical chunks of lower input/output statistics as a second group of physical chunks including the fifth physical chunk, and relocating data of the selected second group to a second physical extent which includes the sixth physical chunk and is in the second storage device.

18. A method for deduplication and storage tiering in a storage controller which controls a first storage device and a second storage device, the first storage device including a storage area which comprises a plurality of physical chunks, the second storage device including a storage area which comprises a plurality of physical chunks and having a lower access speed than the first storage device, the storage controller including a configuration management unit and an input/output controller, the configuration management unit constructing a logical disk including a virtual storage area which comprises a plurality of logical chunks, based on the storage area of each of the first and second storage devices, the configuration management unit providing the logical disk to a host computer utilizing a tiered storage system which comprises the first and second storage devices and the storage controller, the input/output controller reading data from the first or second storage device or writing data to the first or second storage device, in accordance with an access request from the host computer, the method comprising:

when first data is virtually written to a first logical chunk in accordance with the access request, determining whether second data of same content as the first data is stored in at least one of the first and second storage devices;

in a first case where the second data is stored in a first physical chunk which is allocated at least to a second logical chunk and is in one of the first and second storage devices, allocating the first physical chunk to the first logical chunk and preventing actual writing of the first data for deduplication, and in a second case where the second data is stored in neither of the first and second storage devices, allocating, to the first logical chunk, a second physical chunk which is free and is in one of the first and second storage devices, and causing the input/output controller to write the first data to the second physical chunk;

acquiring input/output statistics indicating states of access to the plurality of logical chunks;

acquiring, based on the input/output statistics of the plurality of logical chunks, input/output statistics of physical chunks, each of which is allocated to one or more of the plurality of logical chunks; and executing at least one of a first relocation operation and a second relocation based on the input/output statistics of the physical chunks, wherein the first relocation operation includes relocating, to a fourth physical chunk in the first storage device, data in a third physical chunk in the second storage device, the third physical chunk being allocated to a third logical chunk; and the second relocation operation includes relocating, to a sixth physical chunk in the second storage device, data in a fifth physical chunk in the first storage device, the fifth physical chunk being allocated to a fourth logical chunk.

19. The method of claim 18, wherein acquiring the input/output statistics of the physical chunks includes when the third physical chunk is allocated to two or more logical chunks including the third logical chunk, acquiring a sum total of input/output statistics of the two or more logical chunks as an input/output statistic of the third physical chunk; and when the first relocation operation is executed, taking over the sum total of the input/output statistics of the two or more logical chunks as an input/output statistic of the fourth physical chunk.

20. The method of claim 18, wherein:

the storage area of each of the first and second storage devices is divided for management into a plurality of physical extents each comprising a certain number of physical chunks;

the first relocation operation further includes selecting, from non-selected physical chunks in the second storage device, physical chunks of higher input/output statistics as a first group of physical chunks including the third physical chunk, and relocating data of the selected first group to a first physical extent which includes the fourth physical chunk and is in the first storage device; and the second relocation operation further includes selecting, from non-selected physical chunks in the first storage device, physical chunks of lower input/output statistics as a second group of physical chunks including the fifth physical chunk, and relocating data of the selected second group to a second physical extent which includes the sixth physical chunk and is in the second storage device.

* * * * *